US012672647B2

(12) United States Patent
Bachman et al.

(10) Patent No.: US 12,672,647 B2
(45) Date of Patent: Jul. 7, 2026

(54) VEHICLE WITH SPRAY CONTROL SYSTEM AND METHOD

(71) Applicant: Transportation IP Holdings, LLC, Norwalk, CT (US)

(72) Inventors: Mark Bachman, Albia, IA (US); Michael VanderLinden, Knoxville, IA (US); Norman Wellings, Agency, IA (US); Mark Bradshaw Kraeling, West Melbourne, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 34 days.

(21) Appl. No.: 18/968,629

(22) Filed: Dec. 4, 2024

(65) Prior Publication Data

US 2025/0089697 A1 Mar. 20, 2025

Related U.S. Application Data

(63) Continuation-in-part of application No. 17/461,930, filed on Aug. 30, 2021, now abandoned.

(60) Provisional application No. 63/072,586, filed on Aug. 31, 2020.

(51) Int. Cl.
*A01M 7/00* (2006.01)

(52) U.S. Cl.
CPC ........ *A01M 7/0089* (2013.01); *A01M 7/0014* (2013.01); *A01M 7/0057* (2013.01)

(58) Field of Classification Search
None
See application file for complete search history.

(56) References Cited

U.S. PATENT DOCUMENTS

| | | | |
|---|---|---|---|
| 10,569,792 | B2 | 2/2020 | Fahmy et al. |
| 2017/0313332 | A1 | 11/2017 | Paget et al. |
| 2019/0176862 | A1 | 6/2019 | Kumar et al. |
| 2019/0246617 | A1 | 8/2019 | Grimm et al. |
| 2020/0045878 | A1 | 2/2020 | Zerulla et al. |
| 2020/0205394 | A1 | 7/2020 | Day et al. |
| 2020/0238322 | A1 | 7/2020 | Stuke et al. |
| 2022/0061304 | A1 | 3/2022 | Bachman et al. |

(Continued)

FOREIGN PATENT DOCUMENTS

FR 2913379 A1 * 9/2008 ............. B60N 3/002

*Primary Examiner* — Peter D Nolan
*Assistant Examiner* — Michael F Whalen
(74) *Attorney, Agent, or Firm* — K&L Gates LLP

(57) ABSTRACT

A vehicle system with spray control is disclosed. The vehicle system includes a vehicle, a self-propelled platform, a dispenser, and a controller. The vehicle includes a first rail and a second rail. The self-propelled platform includes a first wheel assembly, a second wheel assembly, and a coupling device. The first and second wheel assemblies are configured to engage the first and second rails, respectively, to advance the self-propelled platform relative to the vehicle. The coupling device is centrally positioned on a floor of the self-propelled platform, and the coupling device is configured to receive the dispenser. The dispenser is configured to dispense a composition onto at least a portion of an environmental feature adjacent to the vehicle. The controller is configured to operate one or more of the vehicle, the self-propelled platform, or the dispenser based at least in part on environmental information.

20 Claims, 15 Drawing Sheets

(56)           References Cited

U.S. PATENT DOCUMENTS

| | | |
|---|---|---|
| 2022/0132830  A1 | 5/2022 | Van Alphen |
| 2022/0142142  A1 | 5/2022 | Van Alphen |

* cited by examiner

VEHICLE WITH SPRAY CONTROL SYSTEM AND METHOD

CROSS-REFERENCE TO RELATED APPLICATIONS

This application is a continuation-in-part of U.S. patent application Ser. No. 17/461,930, filed on Aug. 30, 2021, which claims priority to U.S. Provisional Patent Application No. 63/072,586, filed on Aug. 31, 2020, the entire disclosures of which are hereby incorporated by reference herein.

BACKGROUND

Technical Field

Embodiments of the subject matter disclosed herein relate to systems for vegetation control, maintenance of way along a route, or vehicular transport, as well as systems including a self-propelled platform that can travel between vehicles of a multi-vehicle vehicle system.

Discussion of Art

Vegetation growth is a dynamic aspect for routes such as paths, tracks, roads, etc. Over time, vegetation can grow in such a way as to interfere with travel over the route and must be managed. Vegetation management may be time and labor intensive. For both in-vehicle and wayside camera systems, these camera systems may capture information relating to the state of vegetation relative to a route, but that information is not actionable.

As such, it may be desirable to develop systems and methods for vegetation control that differs from those that are currently available.

BRIEF DESCRIPTION

In one embodiment, a vegetation control system is provided that includes a vehicle platform for a vehicle; a dispenser that can dispense a spray composition onto at least a portion of an environmental feature adjacent to the vehicle; a controller, and the controller is configured to operate one or more of the vehicle, the vehicle platform, and the dispenser based at least in part on environmental information provided to the controller.

In one embodiment, a vehicle system is provided that can traverse, fill, and empty compatible cars in remote environments without access to traditional ground equipment. The vehicle system can be used for managing aspects of maintenance of way (MoW). For a rail embodiment, a set of wheels, each having a wheel profile, supports a vehicle platform (such as a truck or bogie) and allows the vehicle system to traverse various equipment around bends and curves in the track without climbing or scarring of a rail that the bogie rides on allowing for safe operation and minimal wear. A self-centering device keeps the bogie in a central location of a track. This allows for relatively better weight distribution as well as reducing or eliminating wear to the rail. A redundant lock has both a clamp style locking dog, which may use a swing arm attached to hydraulic cylinders to automatically attach and release from the car after forward or reverse movement has stopped.

BRIEF DESCRIPTION OF THE DRAWINGS

The subject matter may be understood from reading the following description of non-limiting examples, with reference to the attached drawings, wherein below.

DETAILED DESCRIPTION

Figure 1:
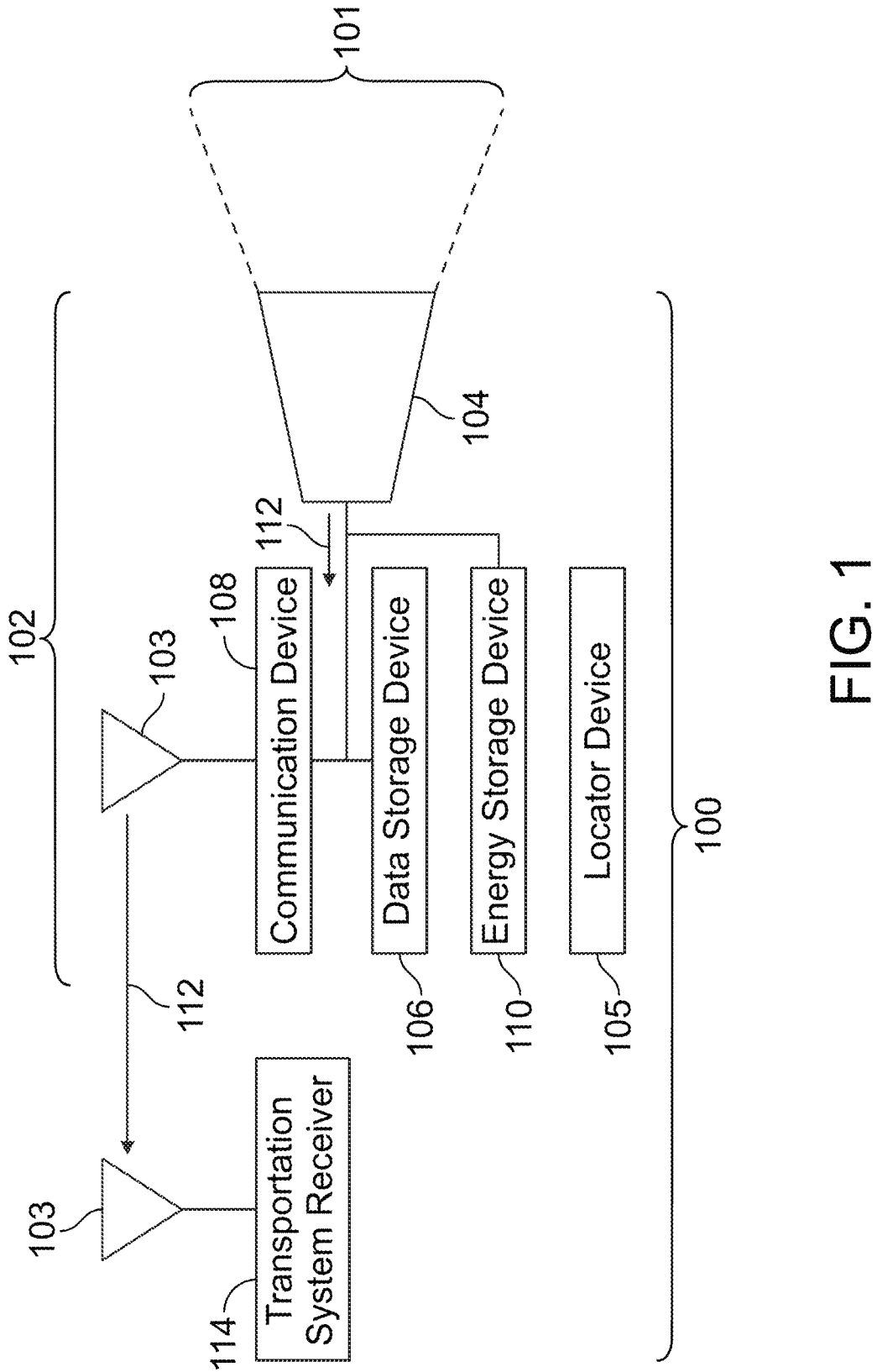
FIG. 1 illustrates a portable system for capturing and communicating transportation data related to vehicles or otherwise to a transportation system, according to at least one example of the present disclosure.

Referring to FIGS. 1-16, a system for vegetation control, maintenance of way along a route, vehicular transport therefore, and associated methods are disclosed. In one embodiment, a vegetation control system is provided that includes a vehicle platform for a vehicle; a dispenser that can dispense a composition onto at least a portion of an environmental feature adjacent to the vehicle; and a controller, and the controller can operate one or more of the vehicle, the vehicle platform, and the dispenser based at least in part on environmental information.

The controller may communicate with a position device that may provide location information. Location information can include position data on the vehicle, as well as the vehicle speed, data on the route over which the vehicle will travel, and various areas relating to the route. Non-vehicle information may include whether the vehicle is in a populated area, such as a city, or in the country. It may indicate whether the vehicle is on a bridge, in a draw, in a tunnel, or on a ridge. It may indicate whether the route is following along the bank of a river or an agricultural area. Additional information may include which side of the vehicle which of these features is on. The controller may actuate the dispenser based at least in part on position data obtained by the controller from the position device. During use, the controller may prevent the dispenser from spraying a spray composition while in a tunnel or near a structure. As detailed herein, the controller may control such spray factors as the duration, pressure, angle, and spray pattern in response to vegetation being higher, lower, nearer, or farther away from the vehicle.

In one embodiment, the controller includes a spray condition data acquisition unit for acquiring spray condition data for spraying a spray composition comprising an herbicide from a storage tank to a spray range defined at least in part by the environmental feature adjacent to the vehicle.

The dispenser may include a plurality of spray nozzles for spraying herbicides at different heights in the vertical direction. Optionally, the dispenser may include one or more of a variable angle spray nozzle capable of automatically adjusting the spraying angle of the spray composition. The controller can select one or more nozzles and/or adjust an aim of the selected nozzles.

Regarding environmental information, this is information that the controller may use that could affect the application of the spray composition. Suitable sensors may collect and communicate the environmental information to the controller. Environmental information may include one or more of a traveling speed of the vehicle or vehicle platform, an operating condition of the dispenser, a contents level of dispenser tanks, a type of vegetation, a quantity of vegetation, a terrain feature of a route section adjacent to the dispenser, an ambient humidity level, an ambient temperature level, a direction of travel of the vehicle, curve or grade information of the vehicle route, a direction of travel of wind adjacent to the vehicle, a windspeed of air adjacent to the vehicle, a distance of the vehicle from a determined protected location, a distance of the vehicle from the vegetation. Note that rainfall rates may be calculated by the controller in to spray composition concentration determinations. Spraying a concentrated mixture that is diluted by rainfall can achieve an intended dosage at the target foliage.

As used herein, a camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

During use, the controller responds to the environmental information or to operator input by switching operating modes of the vehicle and/or of the dispenser. The controller may switch operating modes to selectively control one or more of activating only a subset of the dispenser nozzles. For example, if sensors or maps indicate that there is a river on one side of the vehicle at a location on the route and tall weeds in a ditch on the other side then the controller may control the dispenser to activate the nozzles on the side with the weeds but not activate on the side with the river. Further, the controller may ensure that nozzles face downward to cover the weeds that are lower than the route because they are in a ditch. That is, the dispenser may have one or more plural nozzles and these are organized into subsets, wherein the subsets may be on one or more of one side of the vehicle relative to the other, high spraying, low spraying, horizontal spraying, forward spraying, and rearward spraying. The dispenser may have adjustable nozzles that can selectively wide spray patterns and narrow streaming spray patterns. The dispenser may have one or more adjustable nozzles that can be selectively pointed in determined directions. The controller may determine, based at least in part on environmental information, that a particular type of foliage is present, a preferred spray composition component is effective (and selected by the controller), as well as whether the selected spray composition component should be applied to the leaves/stalk or to the roots/soil; and, the appropriate nozzles and pumps are activated by the controller to deliver the spray composition as determined.

In one embodiment, the controller controls a concentration of active chemicals within the composition being sprayed through the dispenser. The controller controls a mixture ratio of the composition, and the composition is a mixture of multiple active chemicals. Multiple storage tanks, with necessary pumps and tubing, allow the controller to control concentrations and mixtures of active chemicals in the spray composition. The controller can determine, in response to detection of one or more of a type of vegetation/weed; by a size of weeds; by a terrain feature what the mixture ratio and/or the concentration of active chemicals is in the spray composition.

The controller may determine a concentration, a mixture, or both of the spray composition based at least in part by a vehicle location relative to a sensitive zone. Sensitive zones can be designated, but can include populated areas, protected wetlands, and the like.

The dispenser can respond to the controller by controlling a pressure at which the spray composition is dispensed (distance and the quantity dispensed). The controller may change these parameters based at least in part on the environmental information. For example, during use, the dispenser may spray more spray composition on a side of a vehicle facing outward during traversal of the curve, and relatively less spray composition on an inward facing side during the traversal of the curve. In that way, the wayside (and its weeds) receive an equal amount of spray chemical coverage even though the relative speed of the inward and outward sides differ. Even more simply, as the vehicle moves faster, the dispenser may dispense more spray material more quickly to maintain a controlled amount of spray chemical applied to the vegetation. In one embodiment, the controller adjusts the concentration rather than the quantity of the spray composition that is applied relative to changes in speed.

In one embodiment, the dispenser can selectively add a foaming agent to the spray composition. As noted, the spray composition can be selected from a pre-mixed and ready-to-use concentration or can have a fluid reservoir (e.g., water) to which concentrated chemicals can be added in a determined dosage. In one embodiment, the dosage is static. In other embodiments the concentration or dosage of the spray composition can be controlled by the controller. This concentration may be based in part on environmental information, vehicle speed, vegetation type, location of the vehicle relative to other vehicles, structures or people, and the like.

Suitable spray composition components may be one or more of selective herbicides, non-selective herbicides, pesticides, insecticides, fungicides, defoliants, functional fluids, and the like, and mixtures of two or more of the foregoing. Suitable herbicides may include one or more of acetochlor; acifluorfen; alachlor; ametryn; atrazine; aminopyralid; benefin; bensulfuron; bensulide; bentazon; bromacil; bromoxynil; butylate; carfentrazone; chlorimuron; chlorsulfuron; clethodim; clomazone; clopyralid; cloransulam; cycloate; desmedipham; dicamba; dichlobenil; diclofop; diclosulam; diflufenzopyr; dimethenamid; diquat; diuron; endothall; ethalfluralin; ethofumesate; fenoxaprop; fluazifop-P; flucarbazone; flufenacet; flumetsulam; flumiclorac; flumioxazin; fluometuron; fluroxypyr; fomesafen; foramsulfuron; glufosinate; glyphosate; halosulfuron; hexazinone; imazamethabenz; imazamox; imazapic; imazaquin; imazethapyr; isoxaben; isoxaflutole; lactofen; linuron; mesotrione; metolachlor-s; metribuzin; metsulfuron; molinate; napropamide; naptalam; nicosulfuron; norflurazon; oryzalin; oxadiazon; oxyfluorfen; paraquat; pelargonic acid; pendimethalin; phenmedipham; picloram; primisulfuron; prodiamine; prometryn; pronamide; propanil; prosulfuron; pyrazon; pyrithiobac; quinclorac; quizalofop; rimsulfuron; sethoxydim; siduron; simazine; sulfentrazone; sulfometuron; sulfosulfuron; tebuthiuron; terbacil; thiazopyr; thifensulfuron; thiobencarb; tralkoxydim; triallate; triasulfuron; tribenuron; triclopyr; trifluralin; and triflusulfuron. Other suitable herbicides may include "organic herbicides", such as D-Limonene. Environmentally friendlier spray composition components can be selectively applied in environmentally sensitive areas, whereas more aggressive chemicals can be applied otherwise. Suitable functional fluids may include a foamer, a stabilizer, a wetting agent (e.g, a surfactant), a thickener, a colorant (to indicate application), and a noxious agent to discourage people and/or animals from approaching the application area. Other suitable functional fluids may include one or more of a metal corrosion inhibitor, a friction modifier or lubricant, a dust reducer, a fire retardant, and the like to achieve an affect on the route, the ballast, the ties, the rail, the wayside, and structures and items found adjacent to routes over which the vehicle may travel.

In one embodiment, the vehicle has maintenance equipment (not shown) mounted to the vehicle platform that can maintain a section of a route adjacent to the vehicle. Suitable maintenance equipment may be selected from one or more of an auger, a mower, a chainsaw or circular saw, an excavator scoop, and a winch or hoist. During use, the maintenance equipment deploys to perform work adjacent to the vehicle. The vehicle may be stopped for the action, or alternatively, may be mobile. The environmental information from the image system is used by the controller to position the maintenance equipment. Additionally or alternatively the maintenance equipment may be used with the dispenser. The platform may dynamically shift to counter the weight of the maintenance equipment. This may reduce or eliminate tip-over of the vehicle when, for example, the excavator lifts a heavy load cantilevered and at a relatively longer distance from the platform. Environmental data allows the controller to adjust the platform, and any couplers of the maintenance equipment to the platform, to compensate for imbalances caused by the task at hand. In one embodiment, the dispenser is mounted on a controllable boom that can extend the reach of the dispenser nozzles and can aim them in directions generally not obtainable if spraying directly from the platform.

FIG. 1 illustrates a control system 100 for a vehicle (not shown in FIG. 1) that can capture and communicate data related to an environmental condition of a route over which the vehicle can travel and to determine actions to take relative to vegetation adjacent to that route, and the like according to one embodiment.

The environmental information acquisition system includes a portable unit 102 having a camera 104, a data storage device 106 and/or a communication device 108, and a battery or other energy storage device 110. The portable unit may be portable in that the portable unit is small and/or light enough to be carried by a single adult human, however there are some embodiments in which a larger unit or one that is permanently affixed to the vehicle would be suitable. The portable unit can capture and/or generate image data 112 of a field of view 101. For example, the field of view may represent a solid angle or area over which the portable unit can be exposed to the environment and thereby to generate environmental information. The image data can include still images, videos (e.g., moving images or a series of images representative of a moving object), or the like, of one or more objects within the field of view of the portable unit. In any of the embodiments of any of the systems described herein, data other than image data may be captured and communicated. For example, the portable unit may have sensors for capturing image data outside of the visible light spectrum or a microphone for capturing audio data, a vibration sensor for capturing vibration data, elevation and location data, information relating to the grade/slope, and the surrounding terrain, and so on. Terrain information can include whether there is a hill side, a ditch, or flat land adjacent to the route, whether there is a fence or a building, information about the state of the route itself (e.g., ballast and ties, painted lines, and the like), and information about the vegetation. The vegetation information can include the density of the foliage, the type of foliage, the thickness of the stalks, the distance from the route, the overhang of the route by the foliage, and the like.

A suitable portable unit may include an Internet protocol camera, such as a camera that can send video data via the Internet or another network. In one aspect, the camera can be a digital camera capable of obtaining relatively high quality image data (e.g., static or still images and/or videos). For example, the camera may be an Internet protocol (IP) camera that generates packetized image data. A suitable camera can be a high definition (HD) camera capable of obtaining image data at relatively high resolutions.

The data storage device may be electrically connected to the portable unit and can store the image data. The data storage device may include one or more computer hard disk drives, removable drives, magnetic drives, read only memories, random access memories, flash drives or other solid state storage devices, or the like. Optionally, the data storage device may be disposed remote from the portable unit, such as by being separated from the portable unit by at least several centimeters, meters, kilometers, as determined at least in part by the application at hand.

The communication device may be electrically connected to the portable unit and can communicate (e.g., transmit, broadcast, or the like) the image data to a transportation system receiver 114 located off-board the portable unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 103, that include and/or are connected with one or more processors (e.g., microprocessors, controllers, or the like).

In one embodiment, the portable unit includes the camera, the data storage device, and the energy storage device, but not the communication device. In such an embodiment, the portable unit may be used for storing captured image data for later retrieval and use. In another embodiment, the portable unit comprises the camera, the communication device, and the energy storage device, but not the data storage device. In such an embodiment, the portable unit may be used to communicate the image data to a vehicle or other location for immediate use (e.g., being displayed on a display screen), and/or for storage remote from the portable unit (this is, for storage not within the portable unit). In another embodiment, the portable unit comprises the camera, the communication device, the data storage device, and the energy storage device. In such an embodiment, the portable unit may have multiple modes of operation, such as a first mode of operation where image data is stored within the portable unit on the data storage device 106, and a second mode of operation where the image data is transmitted off the portable unit for remote storage and/or immediate use elsewhere.

A suitable camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that can wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device suitable for portable energy storage for use in an electronic device. Another suitable energy storage device, albeit more of an energy provider than storage, include a vibration harvester and a solar panel, where energy is generated and then provided to the camera system.

The portable unit can include a locator device 105 that generates data used to determine the location of the portable unit. The locator device can represent one or more hardware circuits or circuitry that include and/or are connected with one or more processors (e.g., controllers, microprocessors, or other electronic logic-based devices). In one example, the locator device is selected from a global positioning system (GPS) receiver that determines a location of the portable unit, a beacon or other communication device that broadcasts or transmits a signal that is received by another component (e.g., the transportation system receiver) to determine how far the portable unit is from the component that receives the signal (e.g., the receiver), a radio frequency identification (RFID) tag or reader that emits and/or receives electromagnetic radiation to determine how far the portable unit is from another RFID reader or tag (e.g., the receiver), or the like. The receiver can receive signals from the locator device to determine the location of the locator device 105 relative to the receiver and/or another location (e.g., relative to a vehicle or vehicle system). Additionally or alternatively, the locator device can receive signals from the receiver (e.g., which may include a transceiver capable of transmitting and/or broadcasting signals) to determine the location of the locator device relative to the receiver and/or another location (e.g., relative to a vehicle or vehicle system).

Figure 2:
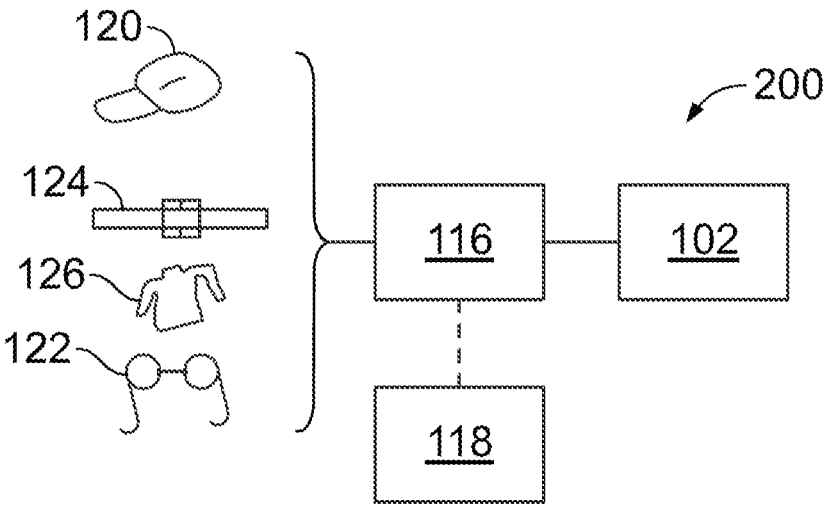
FIG. 2 illustrates a portable system, according to at least one example of the present disclosure.

FIG. 2 illustrates an environmental information capture system 200 according to another embodiment. This system includes a garment 116 that can be worn or carried by an operator 118, such as a vehicle operator, transportation worker, or other person. A portable unit or locator device can be attached to the garment. For example, the garment may be a hat 120 (including a garment worn about the head), an ocular device 122 (e.g., a Google Glass™ device or other eyepiece), a belt or watch 124, part of a jacket 126 or other outer clothing, a clipboard, or the like. The portable unit may detachably connected to the garment, or, in other embodiments, the portable unit may be integrated into, or otherwise permanently connected to the garment. Attaching the portable unit to the garment can allow the portable unit to be worn by a human operator of a vehicle (or the human operator may be otherwise associated with a transportation system), for capturing image data associated with the human operator performing one or more functions with respect to the vehicle or transportation system more generally. The controller can determine if the operator is within a spray zone of one or more dispenser. If the operator is detected within the spray zone, the controller may block or prevent the dispenser from spraying the spray chemical through one or more of the nozzles.

Figure 3:
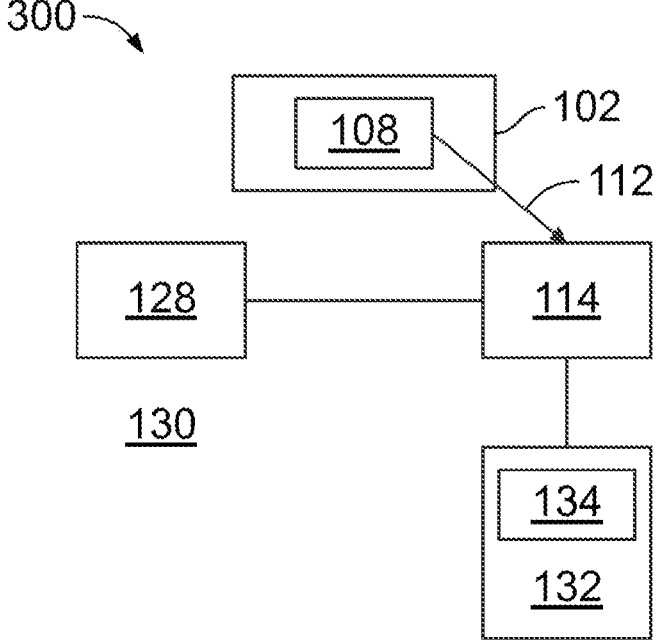
FIG. 3 illustrates another portable system, according to at least one example of the present disclosure.

With reference to FIG. 3, in one embodiment, the portable unit may include the communication device, which can wirelessly communicate the image data to the transportation system receiver. The transportation system receiver can be located onboard a vehicle 128, at a wayside location 130 of a route of the vehicle, or otherwise remote from the vehicle. The illustrated vehicle (see also FIG. 8) is a high rail vehicle that can selectively travel on a rail track and on a roadway. Remote may refer to not being onboard the vehicle, and in embodiments, more specifically, to not within the immediate vicinity of the vehicle, such as not within a WiFi and/or cellular range of the vehicle. In one aspect, the portable unit can be fixed to the garment being worn by an operator of the vehicle and provide image data representative of areas around the operator. For example, the image data may represent the areas being viewed by the operator. The image data may no longer be generated by the portable unit during time periods that the operator is within the vehicle or within a designated distance from the vehicle. Upon exiting the vehicle or moving farther than the designated distance (e.g., five meters) from the vehicle, the portable unit may begin automatically generating and/or storing the image data. As described herein, the image data may be communicated to a display onboard the vehicle or in another location so that another operator onboard the vehicle can determine the location of the operator with the portable unit based on the image data. With respect to rail vehicles, one such instance could be an operator exiting the cab of a locomotive. If the operator is going to switch out cars from a rail vehicle that includes the locomotive, the image data obtained by the portable unit on the garment worn by the operator can be recorded and displayed to an engineer onboard the locomotive. The engineer can view the image data as a double check to ensure that the locomotive is not moved if the conductor is between cars of the rail vehicle. Once it is clear from the image data that the conductor is not in the way, then the engineer may control the locomotive to move the rail vehicle.

Optionally, the image data may be autonomously examined by one or more image data analysis systems or image analysis systems described herein. For example, one or more of the transportation receiver system 114, vehicle, and/or the portable unit may include an image data analysis system (also referred to as an image analysis system) that examines the image data for one or more purposes described herein.

Continuing, FIG. 3 illustrates a camera system 300 according to an embodiment of the invention. The system can include a display screen system 132 located remote from the portable unit and from the vehicle. The display screen system receives the image data from the transportation system receiver as a live feed and display the image data (e.g., converted back into moving images) on a display screen 134 of the display screen system. The live feed can include image data representative of objects contemporaneous with capturing the video data but for communication lags associated with communicating the image data from the portable unit to the display screen system. Such an embodiment may be used, for example, for communicating image data, captured by a human operator wearing or otherwise using the portable unit and associated with the human operator carrying out one or more tasks associated with a vehicle (e.g., vehicle inspection) or otherwise associated with a transportation network (e.g., rail track inspection), to a remote human operator viewing the display screen. A remote human operator, for example, may be an expert in the particular task or tasks, and may provide advice or instructions to the on-scene human operator based on the image data or may actuate and manipulate a dispenser system, maintenance equipment, and the vehicle itself.

Figures 4, 5:
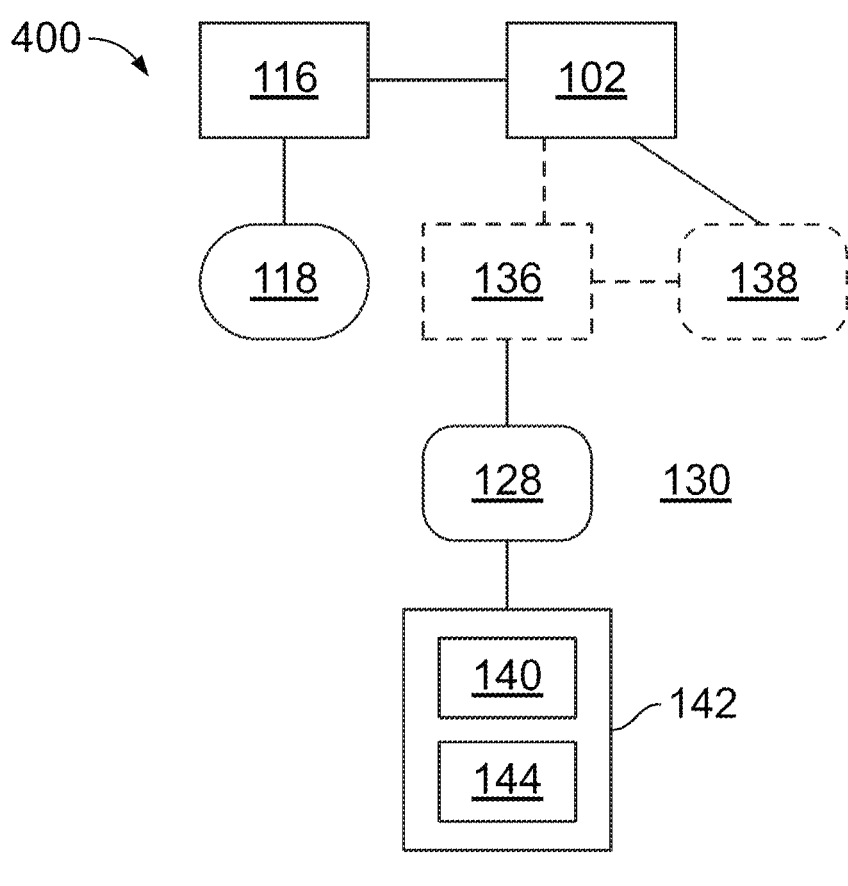
FIG. 4 illustrates a portable system having a garment and a portable unit attached and/or attachable to the garment, according to at least one example of the present disclosure.
FIG. 5 illustrates a system having features and aspects of the invention, according to at least one example of the present disclosure.

FIG. 4 illustrates another embodiment of a camera system 400 having a garment and a portable unit attached and/or attachable to the garment. The system can be similar to the other camera systems described herein, with the system further including a position detection unit 136 and a control unit 138. The position detection unit detects a position of the transportation worker wearing the garment. The configurable position detection unit may be connected to and part of the garment, connected to and part of the portable unit, or connected to and part of the vehicle or a wayside device. The position detection unit may be, for example, a global positioning system (GPS) unit, or a switch or other sensor that detects when the human operator (wearing the garment) is at a particular location in a vehicle, outside but near the vehicle, or otherwise. In one embodiment, the position detection unit can detect the presence of a wireless signal when the portable unit is within a designated range of the vehicle or vehicle cab. The position detection unit can determine that the portable unit is no longer in the vehicle or vehicle cab responsive to the wireless signal no longer being detected or a strength of the signal dropping below a designated threshold. In one embodiment, the The control unit (which may be part of the portable unit) controls the portable unit based at least in part on the position of the transportation worker that is detected by the position detection unit. The control unit can represent hardware circuits or circuitry that include and/or are connected with one or more processors (e.g., microprocessors, controllers, or the like).

In one embodiment, the control unit controls the portable unit to a first mode of operation when the position of the transportation worker that is detected by the position detection unit indicates the transportation worker is at an operator terminal 140 of the vehicle (e.g., in a cab 142 of the vehicle), and to control the portable unit to a different, second mode of operation when the position of the transportation worker that is detected by the position detection unit indicates the transportation worker is not at the operator terminal of the vehicle. In the first mode of operation, for example, the portable unit is disabled from at least one of capturing, storing, and/or communicating the image data, and in the second mode of operation, the portable unit is enabled to capture, store, and/or communicate the image data. In such an embodiment, therefore, it may be the case that the portable unit is disabled from capturing image data when the operator is located at the operator terminal, and enabled when the operator leaves the operator terminal. The control unit can cause the camera to record the image data when the operator leaves the operator cab or operator terminal so that actions of the operator may be tracked. For example, in the context of a rail vehicle, the movements of the operator may be examined using the image data to determine if the operator is in a safe area during operation of a set of dispensers or maintenance equipment.

In another embodiment, the control unit can control the portable unit to a first mode of operation when the position of the transportation worker that is detected by the position detection unit 136 indicates the transportation worker is in an operator cab 142 of the vehicle and to control the portable unit to a different, second mode of operation when the position of the transportation worker that is detected by the position detection unit indicates the transportation worker is not in the operator cab of the vehicle. For example, the portable unit may be enabled for capturing image data when the operator is outside the operator cab, and disabled for capturing image data when the operator is inside the operator cab with no view of the environment. This may be a powered down mode to save on battery life.

In another embodiment, the system has a display screen 144 in the operator cab of the rail vehicle. The communication device of the portable unit can transmit the image data to the transportation system receiver which may be located onboard the vehicle and operably connected to the display screen, for the image data to be displayed on the display screen. Such an embodiment may be used for one operator of a vehicle to view the image data captured by another operator of the vehicle using the portable unit. For example, if the portable camera system is attached to a garment worn by the one operator when performing a task external to the vehicle, video data associated with the task may be transmitted back to the other operator remaining in the operator cab, for supervision or safety purposes.

FIG. 5 illustrates another embodiment of a camera system 500. A control system 146 onboard the vehicle may perform one or more of controlling movement of the vehicle, movement of maintenance equipment, and operation of one or more dispensers (not shown). The control system can control operations of the vehicle, such as by communicating command signals to a propulsion system of the vehicle (e.g., motors, engines, brakes, or the like) for controlling output of the propulsion system. That is, the control system can control the movement (or not) of the vehicle, as well as its speed and/or direction.

The control system can prevent movement of the vehicle responsive to a first data content of the image data and allow movement of the vehicle responsive to a different, second data content of the image data. For example, the control system onboard the vehicle may engage brakes and/or prevent motors from moving the vehicle to prevent movement of the vehicle, movement of the maintenance equipment, or operation of the dispenser responsive to the first data content of the image data indicating that the portable unit (e.g., worn by an operator, or otherwise carried by an operator) is located outside the operator cab of the vehicle and to allow movement and operation responsive to the second data content of the image data indicating that the portable unit is located inside the operator cab.

The data content of the image data can indicate that the portable unit is outside of the operator cab based on a change in one or more parameters of the image data. One of these parameters can include brightness or intensity of light in the image data. For example, during daylight hours, an increase in brightness or light intensity in the image data can indicate that the operator and the portable unit has moved from inside the cab to outside the cab. A decrease in brightness or light intensity in the image data can indicate that the operator and the portable unit has moved from outside the cab to inside the cab. Another parameter of the image data can include the presence or absence of one or more objects in the image data. For example, the control system can use one or more image and/or video processing algorithms, such as edge detection, pixel metrics, comparisons to benchmark images, object detection, gradient determination, or the like, to identify the presence or absence of one or more objects in the image data. If the object is inside the cab or vehicle, then the inability of the control system to detect the object in the image data can indicate that the operator is no longer in the cab or vehicle. But, if the object is detected in the image data, then the control system can determine that the operator is in the cab or vehicle.

Figure 6:
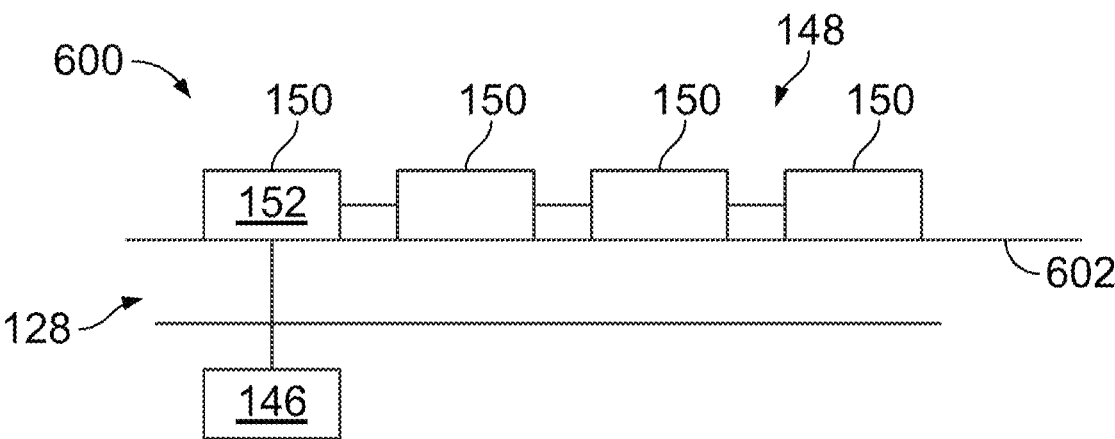
FIG. 6 illustrates a control system, according to at least one example of the present disclosure.

FIG. 6 illustrates one embodiment of the invention that has a vehicle consist (i.e., a group or swarm) 148 that includes plural communicatively interconnected vehicle units 150, with at least one of the plural vehicle units being a lead vehicle unit 152. The vehicle system can be a host of autonomous or semi-autonomous drones. Other suitable vehicles can be an automobile, agricultural equipment, high-rail vehicle, locomotive, marine vessel, mining vehicle, other off-highway vehicle (e.g., a vehicle that is not designed for and/or legally permitted to travel on public roadways), and the like. The consist can represent plural vehicle units communicatively connected and controlled so as to travel together along a route 602, such as a track, road, waterway, or the like. The controller may send command signals to the vehicle units to instruct the vehicle units how to move along the route to maintain speed, direction, separation distances between the vehicle units, and the like.

The control system can prevent movement of the vehicles in the consist responsive to the first data content of the environmental information indicating that the portable unit is positioned in an unsafe area (or not in a safe area) and to allow movement of the vehicles in the consist responsive to the second data content of the environmental information indicating that the portable unit is not positioned in and unsafe area (or in a known safe area). Such an embodiment may be used, for example, for preventing vehicles in a consist from moving when an operator, wearing or otherwise carrying the portable unit, is positioned in a potentially unsafe area relative to any of the vehicle units.

Figure 7:
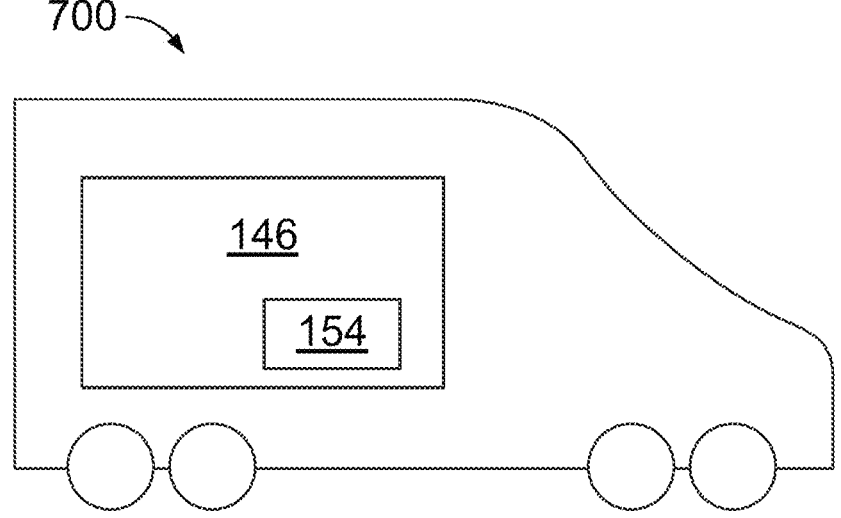
FIG. 7 illustrates a vehicle having aspects of the invention, according to at least one example of the present disclosure.

FIG. 7 illustrates the control system according to one embodiment. The control system 146 can be disposed onboard a high rail vehicle 700 and can include an image data analysis system 154. The illustrated vehicle is a high rail vehicle that can selectively travel on a rail track and on a roadway. The analysis system can automatically process the image data for identifying the first data content and the second data content in the image data and thereby generate environmental information. The control system may automatically prevent and allow movement of the vehicle responsive to the first data and the second data, respectively, that is identified by the image data analysis system. The image data analysis system can include one or more image analysis processors that autonomously examine the image data obtained by the portable unit for one or more purposes, as described herein.

Figure 8:
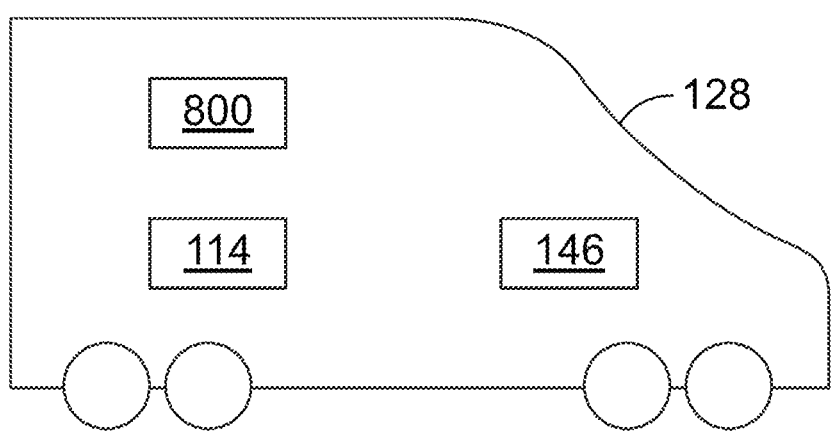
FIG. 8 illustrates a transportation system receiver located onboard a vehicle, according to at least one example of the present disclosure.

FIG. 8 illustrates the transportation system receiver located onboard the vehicle according to one embodiment. The transportation system receiver can wirelessly communicate network data onboard and/or off-board the vehicle, and/or to automatically switch to a mode for receiving the environmental information from the portable unit responsive to the portable unit being active to communicate the environmental information. For example, responsive to the portable unit being active to transmit the environmental information, the transportation system receiver may switch from a network wireless client mode of operation 156 (transmitting data originating from a device onboard the vehicle, such as the control unit) to the mode for receiving the environmental information from the portable unit. The mode for receiving the environmental information from the portable unit may include a wireless access point mode of operation 158 (receiving data from the portable unit).

In another embodiment, the portable unit may include the transportation system receiver located onboard the vehicle. The transportation system receiver can wirelessly communicate network data onboard and/or off-board the vehicle, and/or to automatically switch from a network wireless client mode of operation to a wireless access point mode of operation, for receiving the environmental information from the portable unit. This network data can include data other than environmental information. For example, the network data can include information about an upcoming trip of the vehicle (e.g., a schedule, grades of a route, curvature of a route, speed limits, areas under maintenance or repair, etc.), cargo being carried by the vehicle, or other information. Alternatively, the network data can include the image data. The receiver can switch modes of operation and receive the environmental information responsive to at least one designated condition of the portable unit. For example, the designated condition may be the potable portable unit being operative to transmit the environmental information, or the portable unit being in a designated location. As another example, the designated condition may be movement or the lack of movement of the portable unit. Responsive to the receiver and/or portable unit determining that the portable unit has not moved and/or has not moved into or out of the vehicle, the portable unit may stop generating the environmental information, the portable unit may stop communicating the environmental information to the receiver, and/or the receiver may stop receiving the environmental information from the portable unit. Responsive to the receiver and/or portable unit determining that the portable unit is moving and/or has moved into or out of the vehicle, the portable unit may begin generating the environmental information, the portable unit may begin communicating the environmental information to the receiver, and/or the receiver may begin receiving the environmental information from the portable unit.

In another embodiment of one or more of the systems described herein, the system is configured so that the image data/environmental information can be stored and/or used locally (e.g., in the vehicle), or to be transmitted to a remote location (e.g., off-vehicle location) based on where the vehicle is located. For example, if the vehicle is in a yard (e.g., a switching yard, maintenance facility, or the like), the environmental information may be transmitted to a location in the yard. But, prior to the vehicle entering the yard or a designated location in the yard, the environmental information may be stored onboard the vehicle and not communicated to any location off of the vehicle.

Thus, in an embodiment, the system further comprises a control unit that, responsive to at least one of a location of the portable unit or a control input, controls at least one of the portable unit or the transportation system receiver to a first mode of operation for at least one of storing or displaying the video data on board the rail vehicle and to a second mode of operation for communicating the video data off board the rail vehicle for at least one of storage or display of the video data off board the rail vehicle. For example, the control unit may control at least one of the portable unit or the transportation system receiver from the first mode of operation to the second mode of operation responsive to the location of the portable unit being indicative of the rail vehicle being in a city or populated area.

During operation of the vehicle and/or portable unit outside of a designated area (e.g., a geofence extending around a vehicle yard or other location), the image data generated by the camera may be locally stored in the data storage device of the portable unit, shown on a display of the vehicle, or the like. Responsive to the vehicle and/or portable unit entering into the designated area, the portable unit can switch modes to begin wirelessly communicating the image data to the receiver, which may be located in the designated area. Changing where the image data is communicated based on the location of the vehicle and/or portable unit can allow for the image data to be accessible to those operators viewing the image data for safety, analysis, or the like. For example, during movement of the vehicle outside of the vehicle yard, the image data can be presented to an onboard operator, and/or the image data may be analyzed by an onboard analysis system of the vehicle to generate environmental information and ensure safe operation of the vehicle. Responsive to the vehicle and/or portable unit entering into the vehicle yard, the image data and/or environmental information can be communicated to a central office or management facility for remote monitoring of the vehicle and/or operations being performed near the vehicle.

As one example, event data transmission (e.g., the transmitting, broadcasting, or other communication of image data) may occur based on various vehicle conditions, geographic locations, and/or situations. The image data and/or environmental information may be either pulled (e.g., requested) or pushed (e.g., transmitted and/or broadcast) from the vehicle. For example, image data can be sent from a vehicle to an off-board location based on selected operating conditions (e.g., emergency brake application), a geographic location (e.g., in the vicinity of a crossing between two or more routes), selected and/or derived operating areas of concern (e.g., high wheel slip or vehicle speed exceeding area limits), and/or time driven messages (e.g., sent once a day). The off-board location may request and retrieve the image data from specific vehicles on demand.

Figure 9:
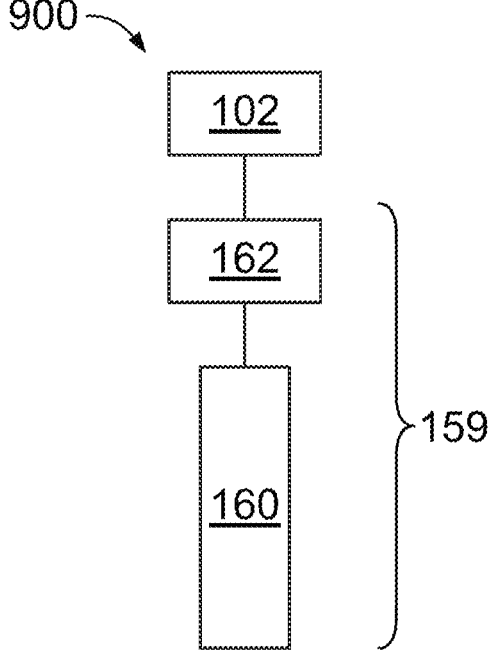
FIG. 9 illustrates an inventive system, according to at least one example of the present disclosure.

FIG. 9 illustrates another embodiment of a camera system 900. The system includes a portable support 159 having at least one leg 160 and a head 162 attached to the at least one leg. The head detachably couples to the portable unit, and the at least one leg autonomously supports (e.g., without human interaction) the portable unit at a wayside location off-board the vehicle. The support can be used to place the portable unit in a position to view at least one of the vehicle and/or the wayside location. The communication device can wirelessly communicate the image data to the transportation system receiver that is located onboard the vehicle. The image data can be communicated from off-board the vehicle to onboard the vehicle for at least one of storage and/or display of the image data onboard the vehicle. In one example, the portable support may be a camera tripod. The portable support may be used by an operator to set up the portable unit external to the vehicle, for transmitting the image data back to the vehicle for viewing in an operator cab of the vehicle or in another location. The image data can be communicated to onboard the vehicle to allow the operator and/or another passenger of the vehicle to examine the exterior of the vehicle, to examine the wayside device and/or location, to examine the route on which the vehicle is traveling, or the like. In one example, the image data may be communicated onboard the vehicle from an off-board location to permit the operator and/or passengers to view the image data for entertainment purposes, such as to view films, videos, or the like.

Figure 10:
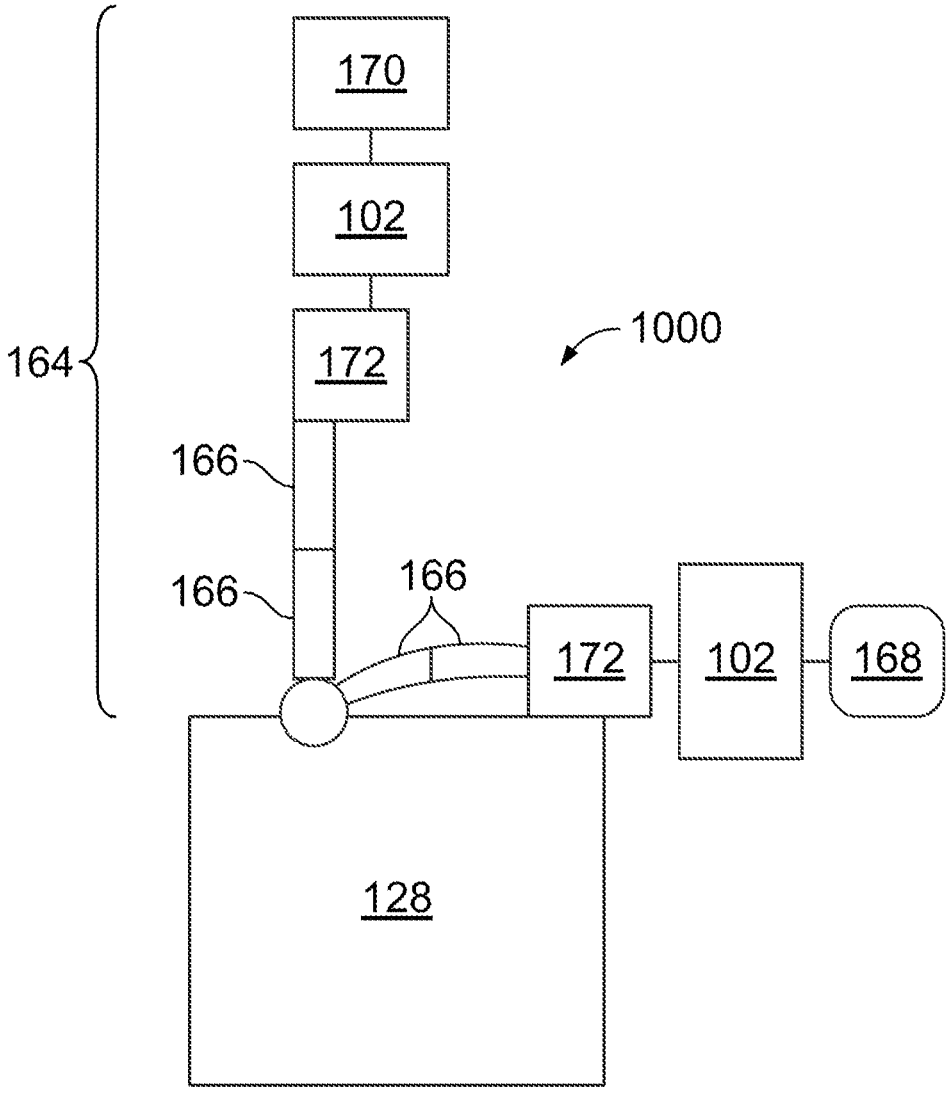
FIG. 10 illustrates another inventive system, according to at least one example of the present disclosure.

FIG. 10 illustrates an embodiment of a spray system 1000. The system includes a controllable mast 164 that can be attached to a platform of the vehicle. The retractable mast has one or more mast segments 166 that support a maintenance equipment implement 168 and a dispenser 170 relative to the vehicle. The mast includes a coupler 172 attached to at least one of the mast segments. The coupler allows for controlled movement and deployment of the maintenance equipment and/or the dispenser. A portable unit 102 can be coupled to the retractable mast.

Figure 11:
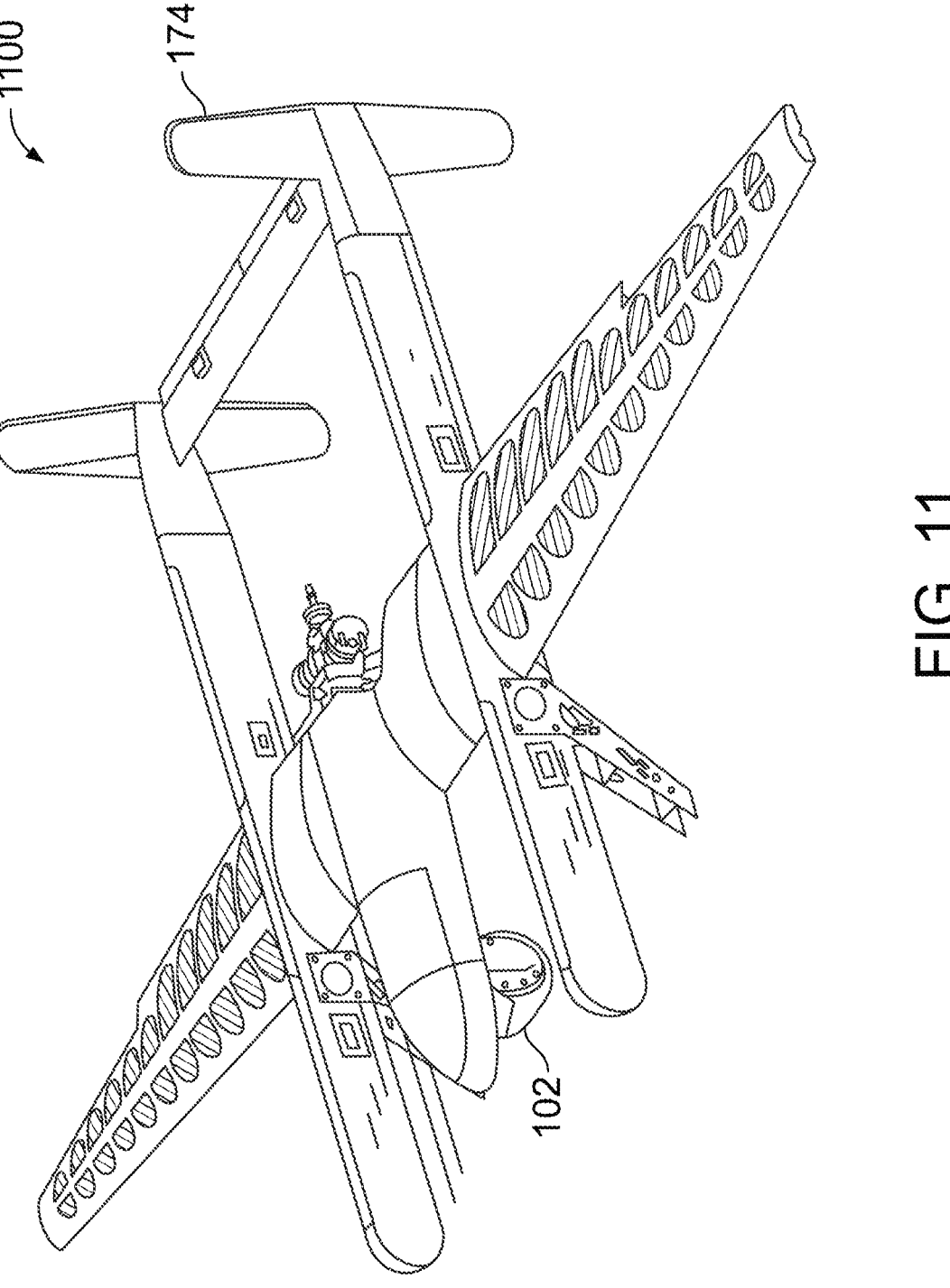
FIG. 11 illustrates a perspective view of a system, according to at least one example of the present disclosure.
Figure 12:
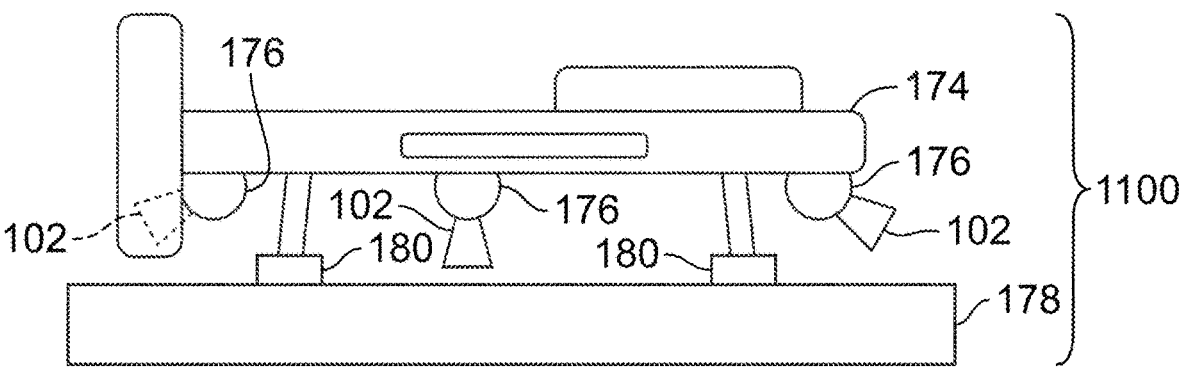
FIG. 12 illustrates a side view of the system shown in FIG. 11, according to at least one example of the present disclosure.
Figure 13:
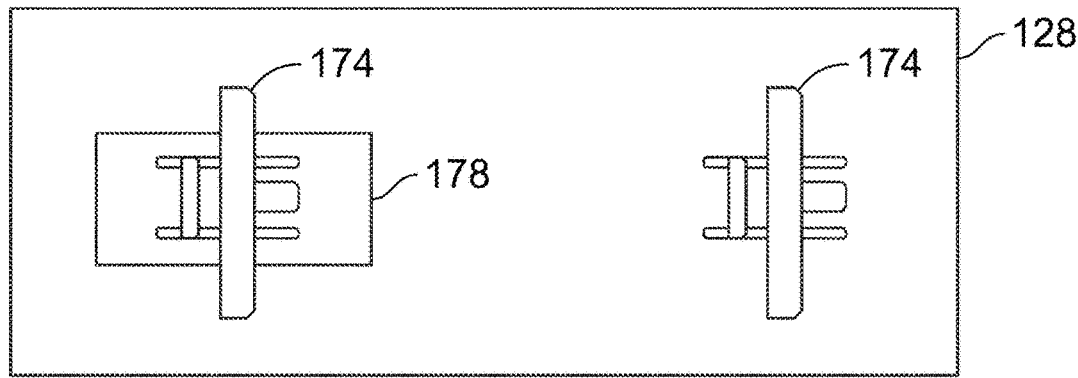
FIG. 13 illustrates a top view of the system shown in FIG. 11, according to at least one example of the present disclosure.

FIGS. 11, 12, and 13 illustrate an embodiment of an environmental information acquisition system 1100. FIG. 11 illustrates a perspective view of the system, FIG. 12 illustrates a side view of the system, and FIG. 13 illustrates a top view of the system 1100. The system includes an aerial device 174 that can navigate via one of remote control or autonomous operation while flying over a route of the ground vehicle. The aerial device may have one or more docks 176 for receiving one or more portable units and may have a vehicle dock for coupling the aerial device to the vehicle. In the illustrated example, the aerial device includes three cameras, with one portable unit facing along a forward direction of travel 1200 of the aerial device, another portable unit facing along a downward direction 1202 toward the ground or route over which the aerial device flies, and another portable unit facing along a rearward direction 1204 of the aerial device. Alternatively, a different number of portable units may be used and/or the portable units may be oriented in other directions.

When the aerial device is in the air, the portable units can be positioned for the cameras to view the route, the vehicle, or other areas near the vehicle. The aerial device may be, for example, a scale dirigible, a scale helicopter, an aircraft, or the like. By "scale" it means that the aerial device may be smaller than needed for transporting humans, such as ¹⁄₁₀ scale or smaller of a human transporting vehicle. A suitable scale helicopter can include multi-copters and the like.

The system can include an aerial device vehicle dock 178 to attach the aerial device to the vehicle. The aerial device vehicle dock can receive the aerial device for at least one of detachable coupling of the aerial device to the vehicle, charging of a battery of the aerial device from a power source of the vehicle, or the like. For example, the dock can include one or more connectors 180 that mechanically or magnetically coupled with the aerial device to prevent the aerial device from moving relative to the dock, that conductively couple an onboard power source (e.g., battery) of the aerial device with a power source of the vehicle (e.g., generator, alternator, battery, pantograph, or the like) so that the power source of the aerial device can be charged by the power source of the vehicle during movement of the vehicle.

The aerial device can fly off of the vehicle to obtain image data that is communicated from one or more of the cameras onboard the aerial device to one or more receivers 114 onboard the vehicle and converted to environmental information. The aerial device can fly relative to the vehicle while the vehicle is stationary and/or while the vehicle is moving along a route. The environmental information may be displayed to an operator on a display device onboard the vehicle and/or may be autonomously examined as described herein by the controller that may operate the vehicle, the maintenance equipment, and/or the dispenser. When the aerial device is coupled into the vehicle dock, one or more cameras can be positioned to view the route during movement of the vehicle.

Figure 14:
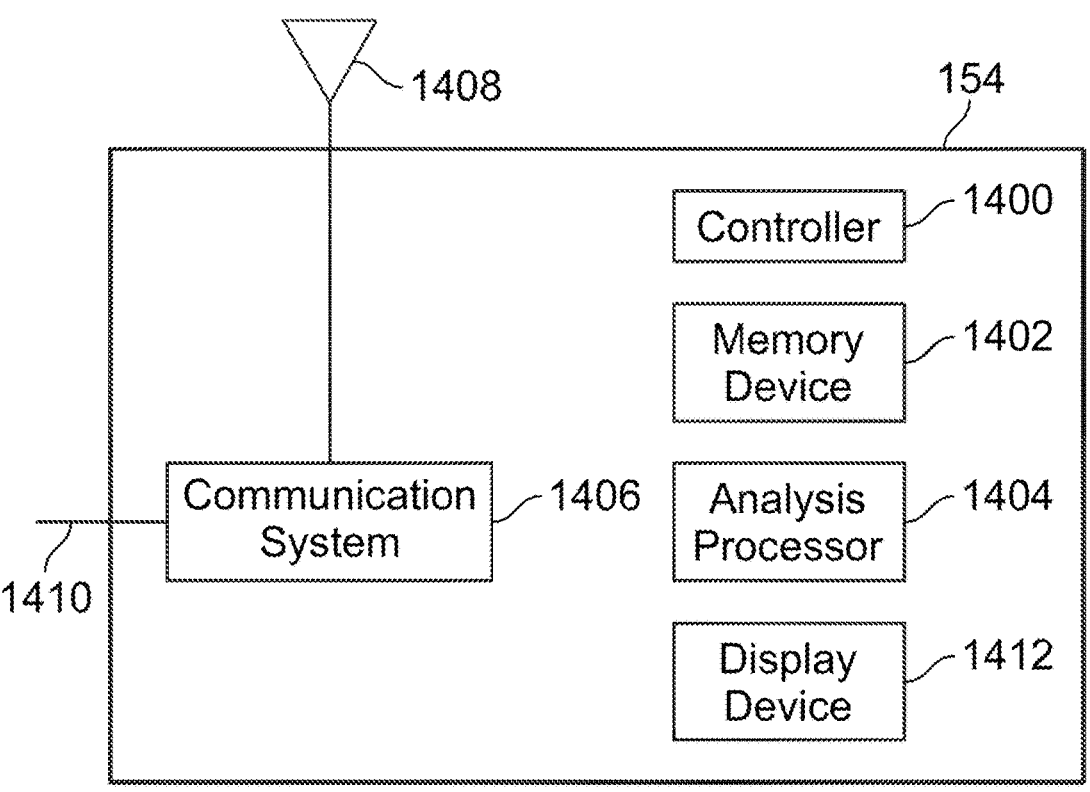
FIG. 14 is a schematic illustration of an image analysis system, according to at least one example of the present disclosure.

FIG. 14 is a schematic illustration of the image analysis system 154 according to one embodiment. As described herein, the image analysis system can be used to examine the data content of the image data to automatically identify objects in the image data, aspects of the environment (such as foliage), and the like. A controller 1400 of the system includes or represents hardware circuits or circuitry that includes and/or is connected with one or more computer processors, such as one or more computer microprocessors. The controller can save image data obtained by the portable unit to one or more memory devices 1402 of the imaging system, generate alarm signals responsive to identifying one or more problems with the route and/or the wayside devices based on the image data that is obtained, or the like. The memory device 1402 includes one or more computer readable media used to at least temporarily store the image data. A suitable memory device can include a computer hard drive, flash or solid state drive, optical disk, or the like.

Additionally or alternatively, the image data and/or environmental information may be used to inspect the health of the route, status of wayside devices along the route being traveled on by the vehicle, or the like. The field of view of the portable unit can encompass at least some of the route and/or wayside devices disposed ahead of the vehicle along a direction of travel of the vehicle. During movement of the vehicle along the route, the portable unit can obtain image data representative of the route and/or the wayside devices for examination to determine if the route and/or wayside devices are functioning properly, or have been damaged, need repair or maintenance, need application of the spray composition, and/or need further examination or action.

The image data created by the portable unit can be referred to as machine vision, as the image data represents what is seen by the system in the field of view of the portable unit. One or more analysis processors 1404 of the system may examine the image data to identify conditions of the vehicle, the route, and/or wayside devices and generate the environmental information. Optionally, the analysis processor can examine the terrain at, near, or surrounding the route and/or wayside devices to determine if the terrain has changed such that maintenance of the route, wayside devices, and/or terrain is needed. For example, the analysis processor can examine the image data to determine if vegetation (e.g., trees, vines, bushes, and the like) is growing over the route or a wayside device (such as a signal) such that travel over the route may be impeded and/or view of the wayside device may be obscured from an operator of the vehicle. As another example, the analysis processor can examine the image data to determine if the terrain has eroded away from, onto, or toward the route and/or wayside device such that the eroded terrain is interfering with travel over the route, is interfering with operations of the wayside device, or poses a risk of interfering with operation of the route and/or wayside device. Thus, the terrain "near" the route and/or wayside device may include the terrain that is within the field of view of the portable unit when the route and/or wayside device is within the field of view of the portable unit, the terrain that encroaches onto or is disposed beneath the route and/or wayside device, and/or the terrain that is within a designated distance from the route and/or wayside device (e.g., two meters, five meters, ten meters, or another distance). The analysis processor can represent hardware circuits and/or circuitry that include and/or are connected with one or more processors, such as one or more computer microprocessors, controllers, or the like.

Acquisition of image data from the portable unit can allow for the analysis processor 1404 to have access to sufficient information to examine individual video frames, individual still images, several video frames, or the like, and determine the condition of the wayside devices and/or terrain at or near the wayside device. The image data optionally can allow for the analysis processor to have access to sufficient information to examine individual video frames, individual still images, several video frames, or the like, and determine the condition of the route. The condition of the route can represent the health of the route, such as a state of damage to one or more rails of a track, the presence of foreign objects on the route, overgrowth of vegetation onto the route, and the like. As used herein, the term "damage" can include physical damage to the route (e.g., a break in the route, pitting of the route, or the like), movement of the route from a prior or designated location, growth of vegetation toward and/or onto the route, deterioration in the supporting material (e.g., ballast material) beneath the route, or the like. For example, the analysis processor may examine the image data to determine if one or more rails are bent, twisted, broken, or otherwise damaged. Optionally, the analysis processor can measure distances between the rails to determine if the spacing between the rails differs from a designated distance (e.g., a gauge or other measurement of the route). The analysis of the image data by the analysis processor can be performed using one or more image and/or video processing algorithms, such as edge detection, pixel metrics, comparisons to benchmark images, object detection, gradient determination, or the like.

A communication system 1406 of the system represents hardware circuits or circuitry that include and/or are connected with one or more processors (e.g., microprocessors, controllers, or the like) and communication devices (e.g., wireless antenna 1408 and/or wired connections 1410) that operate as transmitters and/or transceivers for communicating signals with one or more locations. For example the communication system may wirelessly communicate signals via the antenna and/or communicate the signals over the wired connection (e.g., a cable, bus, or wire such as a multiple unit cable, train line, or the like) to a facility and/or another vehicle system, or the like.

The image analysis system optionally may examine the image data obtained by the portable unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different portable units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

Figure 15:
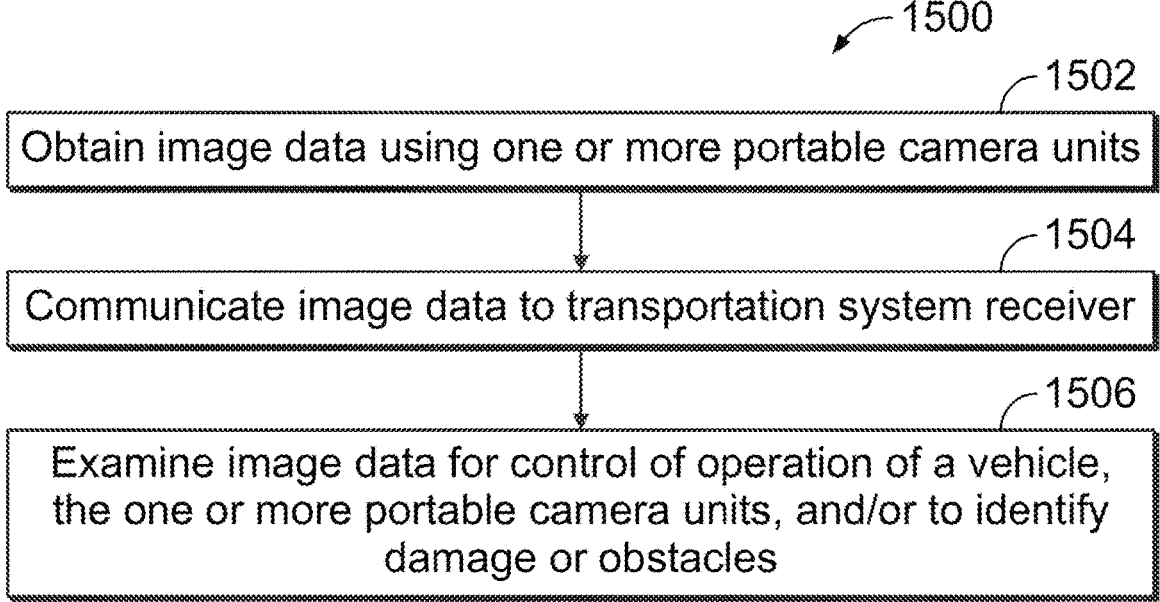
FIG. 15 illustrates a flowchart of a process for obtaining and/or analyzing image data for environmental information, according to at least one example of the present disclosure.

FIG. 15 illustrates a flowchart of one embodiment of a method 1500 for obtaining and/or analyzing image data for transportation data communication. The method may be practiced by one or more embodiments of the systems described herein. At 1502, image data is obtained using one or more portable units. As described above, the portable units may be coupled to a garment worn by an operator onboard and/or off-board a vehicle, may be coupled to a wayside device that is separate and disposed off-board the vehicle but that can obtain image data of the vehicle and/or areas around the vehicle, may be coupled to the vehicle, may be coupled with an aerial device for flying around and/or ahead of the vehicle, or the like. In one aspect, the portable unit may be in an operational state or mode in which image data is not being generated by the portable unit during time periods that the portable unit is inside of (or outside of) a designated area, such as a vehicle. Responsive to the portable unit moving outside of (or into) the designated area, the portable unit may change to another operational state or mode to begin generating the image data.

At 1504, the image data is communicated to the transportation system receiver. For example, the image data can be wirelessly communicated from the portable unit to the transportation system receiver. Optionally, the image data can be communicated using one or more wired connections. The image data can be communicated as the image data is obtained, or may be communicated responsive to the vehicle and/or the portable unit entering into or leaving a designated area, such as a geo-fence.

At 1506, the image data is examined for one or more purposes, such as to control or limit control of the vehicle, to control operation of the portable unit, to identify damage to the vehicle, the route ahead of the vehicle, or the like, and/or to identify obstacles in the route such as encroaching foliage. For example, if the portable unit is worn on a garment of an operator that is off-board the vehicle, then the image data can be analyzed to determine whether the operator is between two or more vehicle units of the vehicle and/or is otherwise in a location where movement of the vehicle would be unsafe (e.g., the operator is behind and/or in front of the vehicle). With respect to vehicle consists, the image data can be examined to determine if the operator is between two or more vehicle units or is otherwise in a location that cannot easily be seen (and is at risk of being hurt or killed if the vehicle consist moves). Optionally, the image data can be examined to determine if the off-board operator is in a blind spot of the on-board operator of the vehicle, such as behind the vehicle.

An image analysis system described above can examine the image data and, if it is determined that the off-board operator is between vehicle units, is behind the vehicle, and/or is otherwise in a location that is unsafe if the vehicle moves, then the image analysis system can generate a warning signal that is communicated to the control unit of the vehicle. This warning signal can be received by the control unit and, responsive to receipt of this control signal, the control unit can prevent movement of the vehicle. For example, the control unit may disregard movement of controls by an onboard operator to move the vehicle, the control unit may engage brakes and/or disengage a propulsion system of the vehicle (e.g., turn off or otherwise deactivate an engine, motor, or other propulsion-generating component of the vehicle). In one aspect, the image analysis system can examine the image data to determine if the route is damaged (e.g., the rails on which a vehicle is traveling are broken, bent, or otherwise damaged), if obstacles are on the route ahead of the vehicle (e.g., another vehicle or object on the route), or the like.

In one embodiment, the environmental information acquisition system data may be communicated via the controller to an offboard back-office system, where various operational and environmental information may be collected, stored and analyzed. In one back-office system, archival or historic information is collected from at least one vehicle having an environmental information acquisition system. The system can store information regarding one or more of the location of spraying, the type and/or concentration of spray composition, the quantity of spray compensation dispensed, the vehicle speed during the spray event, the environmental data (ditch, hill, curve, straightaway, etc.), the weather at the time of application (rain, cloud cover, humidity, temperature), the time of day and time of season during the spray event, and the like. Further, the system may store information regarding the type of vegetation and other related data as disclosed herein.

With the data collected by the controller, the back-office system may determine an effectiveness over time of a particular treatment regime. For example, the back-office system may note whether subsequent applications of spray composition are excessive (e.g., the weeds in a location are still brown and dead from the last treatment) or insufficient (e.g., the weeds in a location are overgrown relative to the last evaluation by an environmental information acquisition system on a vehicle according to an embodiment of the invention). Further, the back-office system can adjust or change the spray composition suggestions to try different concentrations, different chemical components, different spray application techniques to achieve a desired outcome of foliage control.

State and local regulations regarding the use of certain chemicals may differ from location to location. In another embodiment, location of the vehicle at the time of the spray event may be controlled to comply with relevant state or regional regulations in effect at that location. In one operating mode, the controller selects a spray composition (including component types and concentrations) that is the most effective in view of the environmental information but is still compliant with the state and/or local regulations (and as such perhaps not the most effective of all the possible component types and concentrations available for the controller to select from).

In one embodiment, a system (e.g., an environmental information acquisition system) includes a portable unit and a garment. The portable unit includes a camera that can capture at least image data, at least one of a data storage device electrically connected to the camera and can store the image data or a communication device electrically connected to the camera and can wirelessly communicate the image data to a transportation system receiver located off-board the portable unit. The garment can be worn by a transportation worker. The portable unit can be attached to the garment. In one aspect, the garment includes one or more of a hat/helmet, a badge, a smart phone, an electronic watch, or an ocular device. In one aspect, the system can include a locator device that can detect a location of the transportation worker wearing the garment, and a control unit that can control the portable unit based at least in part on the location of the transportation worker that is detected by the locator device. In one aspect, the control unit can control the portable unit to a first mode of operation responsive to the location of the transportation worker that is detected by the locator device indicating that the transportation worker is at an operator terminal of the vehicle and to control the portable unit to a different, second mode of operation responsive to the location of the transportation worker that is detected by the locator device indicating that the transportation worker is not at the operator terminal of the vehicle.

Figure 16:
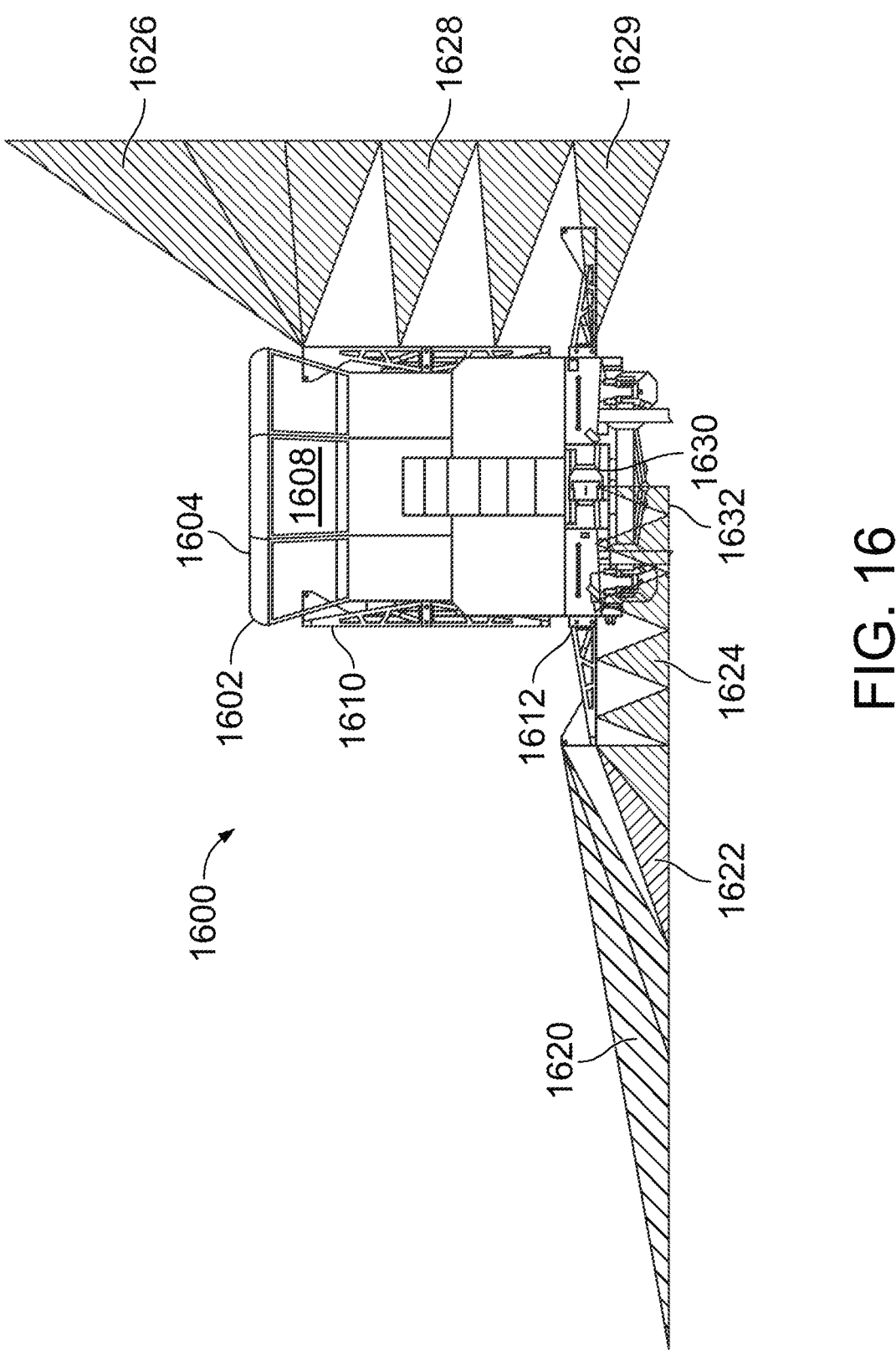
FIG. 16 illustrates a front view of a vehicle including aspects of the invention, according to at least one example of the present disclosure.

With reference to FIG. 16, a vehicle system 1600 having an embodiment of the invention is show. The vehicle system includes a control cab 1602. The control cab includes a roof 1604 over an operator observation deck (not shown) and a plurality of windows 1608. The windows may be oriented at an angle to allow an improved field of view of an operator on the observation deck in viewing areas of the terrain proximate to the control cab. An extendable boom 1610 is one of a plurality of booms (shown in an upright or tight configuration). An extendable boom 1612 is one of the plurality of booms (shown in an extended or open configuration). The booms may be provided in sets, with each set having plural booms and being located on a side of the vehicle system. The booms, and the sets, may be operated independently of each other, or in a manner that coordinates their action depending on the selected operating mode.

Supported by the boom, a plurality of nozzles may provide spray patterns extending from the booms. The location and type of nozzle may produce, for example, and in an extended position, a distal spray pattern 1620, a medial spray pattern 1622, and a proximate spray pattern 1624. While in an upright configuration, the nozzles may produce a relatively high spray pattern 1626, an average height spray pattern 1628, and a low spray pattern 1629. A front rigging 1630 may produce spray patterns 1632 that cover the area in the front (or alternatively in the rear) of the control cab.

The control cab, and its observation deck, may have a self-contained air system and/or or a filter system. This system may prevent operators on the observation deck from contacting or breathing any of the spray composition that is being sprayed. The chemical concentrates onboard the control cab may be sealed separate from the operators. In one embodiment, the spray composition compounds may be concentrated liquids. In one embodiment, the spray composition compounds may be a dry solid. The dry solid may be mixed and/or dissolved in water prior to being sprayed.

During use, as noted herein, the nozzles can be selectively activated. The activation can be accomplished automatically in some embodiments, and manually by an operator in other embodiments. The operator may be located in the observation deck in one embodiment, or may be remote from the vehicle in other embodiments. In addition to the nozzle activation being selective, the application of the spray composition can be controlled by extending or retracting the booms. The booms may be partially extended in some embodiments. The volume and pressure of the spray composition can be controlled through the nozzles. And, the concentration and type of active component in the spray composition can be controlled.

In one embodiment, a water storage tank may be coupled to the control cab. The tank may be both mechanically coupled and fluidically coupled. Multiple water tanks may be added via coupling to the vehicle system. The water level for any water storage tank onboard and fluidically coupled may be monitored by the controller. In one embodiment, the active chemical compositions are stored in the control cab, and water is pumped from the water storage tank to the control cab for mixing and dilution prior to spraying.

The water storage tank may include an energy storage device. Suitable energy storage devices may include batteries, fuel cells, and auxiliary generators (alone or in combination). The aux generator may, for example, generate power to operate a pump that supplies water from the water storage tank through a flexible fluidic coupling to the control cab. The water may be supplied on demand. In one embodiment, the water storage tank simply maintains pressure in the line by operating the pump in response to a pressure drop. Decoupling the hose connecting the vehicle platforms may activate a valve to prevent loss of the water. Check valves may operate to prevent backflow of water. The water storage tank may include a plurality of individual holding cells. Suitable cells may be formed of thermoplastic. These cells may be fluidically couple in series. The cells may reduce or prevent sloshing of the water while the water storage tank is in motion or is on a grade.

In one aspect, the vehicle control unit can include an image data analysis system can automatically process the image data for identifying the first data content and the second data content. The vehicle control unit can automatically prevent and allow action by the vehicle responsive to the first data and the second data, respectively, that is identified by the image data analysis system. In one aspect, the system includes the transportation system receiver that can be located onboard the vehicle, where the transportation system receiver can communicate network data other than the image data at least one of onboard or off-board the vehicle and to automatically switch to a mode for receiving the image data from the portable unit responsive to the portable unit being active to communicate the image data. In one aspect, the system includes a retractable mast configured for attachment to a vehicle. The retractable mast can include one or more mast segments deployable from a first position relative to the vehicle to a second position relative to the vehicle. The second position is higher than the first position. The mast can include a coupler attached to one of the one or more mast segments for detachable coupling of the portable unit to said one of the one or more mast segments. The portable unit is coupled to the retractable mast by way of the coupler and the retractable mast is deployed to the second position, with the portable unit positioned above the vehicle.

In one embodiment, the vehicle is a marine vessel (not shown) and the portable system identifies marine equivalents to foliage. That is, a vessel may detect algal blooms, seaweed beds, oil slicks, and plastic debris, for example. The spray composition may be an algicide (for algal blooms), a water tolerant and non-persistent herbicide (for unwanted seaweed), oil-digesting microbials (for oil slicks), and the like. Other suitable spray compositions may include flocculants, agglomerates, precipitants, pH adjusters and/or buffers, defoamers, dispersants, and the like.

In one embodiment, a vehicle system with spray control is provided. The vehicle system includes a vehicle platform for a vehicle, a dispenser configured to dispense a composition onto at least a portion of an environmental feature adjacent to the vehicle, and a controller configured to operate one or more of the vehicle, the vehicle platform, or the dispenser based at least in part on environmental information.

Optionally, the controller is configured to communicate with a position device and to actuate the dispenser based at least in part on position data obtained by the controller from the position device. The controller may include a spray condition data acquisition unit for acquiring spray condition data for spraying the composition comprising an herbicide from a storage tank to a spray range defined at least in part by the environmental feature adjacent to the vehicle. The dispenser may include a plurality of spray nozzles for spraying herbicides at different heights in a vertical direction.

The dispenser may include a variable angle spray nozzle capable of automatically adjusting a spraying angle of the composition. The environmental information may include one or more of a traveling speed of the vehicle or the vehicle platform, an operating condition of the dispenser, a contents level of dispenser tanks, a type of vegetation, a quantity of the vegetation, a terrain feature of a route section adjacent to the dispenser, an ambient humidity level, an ambient temperature level, a direction of travel of the vehicle, curve or grade information of a vehicle route, a direction of travel of wind adjacent to the vehicle, a windspeed of air adjacent to the vehicle, a distance of the vehicle from a determined protected location, and/or a distance of the vehicle from the vegetation.

The dispenser may include plural dispenser nozzles through which the composition is sprayed, and the controller can be configured to respond to the environmental information by switching operating modes with different ones of the operating modes selectively activating different nozzles of the dispenser nozzles. The dispenser can include plural dispenser nozzles organized into subsets. The subsets may be configured as one or more of: spraying one side of the vehicle, high spraying, low spraying, horizontal spraying, forward spraying, or rearward spraying. The dispenser can have adjustable nozzles that are configured to have selectively wide spray patterns and narrow streaming spray patterns.

The dispenser can have adjustable nozzles that are configured to be selectively pointed in determined directions. The controller can control a concentration of active chemicals within the composition being sprayed through the dispenser. The composition may be a mixture of multiple active chemicals, and the controller can be configured to control a mixture ratio of the multiple active chemicals. The controller may be configured to determine one or more of the mixture ratio or a concentration of the active chemicals in the composition in response to detection of one or more of a type of vegetation, a type of weed, a size of the weed, or a terrain feature.

The controller can be configured to selectively determine a concentration, a mixture, or both the concentration and the mixture of the composition based at least in part on a vehicle location relative to a sensitive zone. The dispenser can be configured to selectively add a foaming agent to the composition. The controller can be configured to control a pressure at which the dispenser dispenses the composition. The controller may be configured to select one or more nozzles of the dispenser or adjust an aim of the one or more nozzles.

The vehicle may be a high rail vehicle configured to selectively travel on a rail track and on a roadway. The vehicle can have maintenance equipment be mounted to the vehicle platform and configured to maintain a section of a route adjacent to the vehicle. The maintenance equipment can include one or more of an auger, a mower, a chainsaw or circular saw, an excavator scoop, a winch, and/or a hoist. The controller can communicate with sensors that determine a nature of vegetation adjacent to the route. The controller can communicate with sensors that determine whether a person is within a spray zone of the spray composition and to block the dispenser from spraying responsive to detecting a person within the spray zone. The controller can communicate with sensors that determine whether a person is within an area where operation of maintenance equipment mounted to the platform would injury the person.

In one embodiment, a method includes dispensing a composition onto at least a portion of an environmental feature adjacent to a vehicle having a vehicle platform. The composition is dispensed from a dispenser. The method also includes operating one or more of the vehicle, the vehicle platform, and/or the dispenser using a controller and based at least in part on environmental information.

In one embodiment, a system includes a dispenser configured to be disposed onboard a vehicle. The dispenser is configured to spray a chemical composition onto at least a portion of an environmental feature adjacent to the vehicle. The system also includes a controller configured to operate one or more of the vehicle or the dispenser based at least in part on the environmental feature.

Referring now to FIGS. 17-23, a system that may include a self-propelled platform that can travel between vehicles of a multi-vehicle vehicle system is disclosed. The self-propelled platform may include a wheel assembly that has four independent wheel assemblies that each may engage a first rail on a first vehicle and second rail on a second vehicle. Each wheel assembly may include a guide that extends away from its respective wheel assembly. Each wheel assembly may have a size and shape so that when the platform moves from the first vehicle to the second vehicle, the guide engages and catches a corresponding rail of the second vehicle. The guide may align a wheel with the corresponding rail. The guide may extend upwardly to ensure, even if the first vehicle and second vehicle are at different heights, the guide may engage the corresponding rail to place the wheel on the corresponding rail of the second vehicle. The wheel assembly itself keeps one of the plural wheels on the first rail during the platform transition until another wheel of the wheel assembly has engaged the second rail. The wheel assembly supports the platform, during operation, so that initially all the wheels start on the first rail, then at least one wheel is on the first rail and at least one is on the second rail, and finally all the wheels of the wheel assembly are on the second rail. In this manner, a different structure, such as a bridge, does not have to be placed between the first and second vehicle to support the platform and allow movement of the platform from the first vehicle to the second vehicle.

A suitable self-propelled platform can include an implement that is rotatably coupled for movement on the self-propelled platform. Examples of implements may include one or more of an excavator with a bucket or scoop, a picker, a mower, a sprayer, and so on. In one embodiment, the implement may be a robotic arm.

Figure 17:
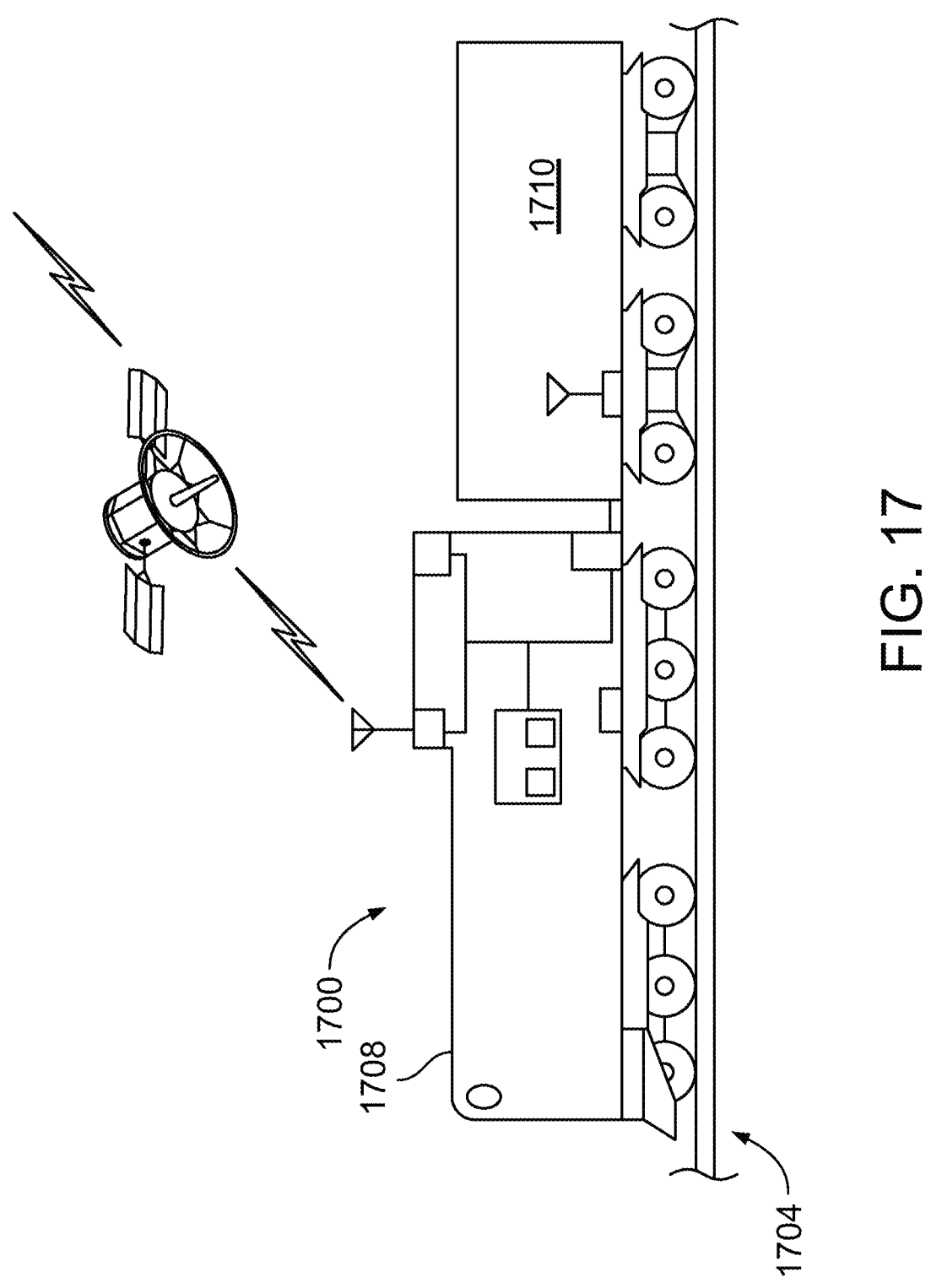
FIG. 17 illustrates a schematic view of a vehicle system, according to at least one example of the present disclosure.

FIG. 17 illustrates a schematic diagram of one example of a vehicle system 1700 in accordance with an embodiment of the invention. FIG. 17 shows a vehicle system that is a rail vehicle. In other embodiments, as suitable vehicle system can be an off-road vehicle, construction vehicle, mining vehicle, marine vessel, and the like. The vehicle system may include two or more vehicles. The vehicle system may travel along a route 1704 on a trip from a starting or departure location to a destination or arrival location. In the illustrated example, the vehicle system may include a propulsion-generating vehicle 1708 and a non-propulsion-generating vehicle 1710. These vehicles may be mechanically interconnected to one another to travel together along the route. In another embodiment, the vehicles in the vehicle system may be logically or virtually coupled together, but not mechanically coupled together. For example, the vehicles may communicate with each other to coordinate their movements so that the vehicles move together as a convoy, platoon, swarm, fleet or consist without the vehicles being mechanically coupled with each other by couplers.

Figure 18:
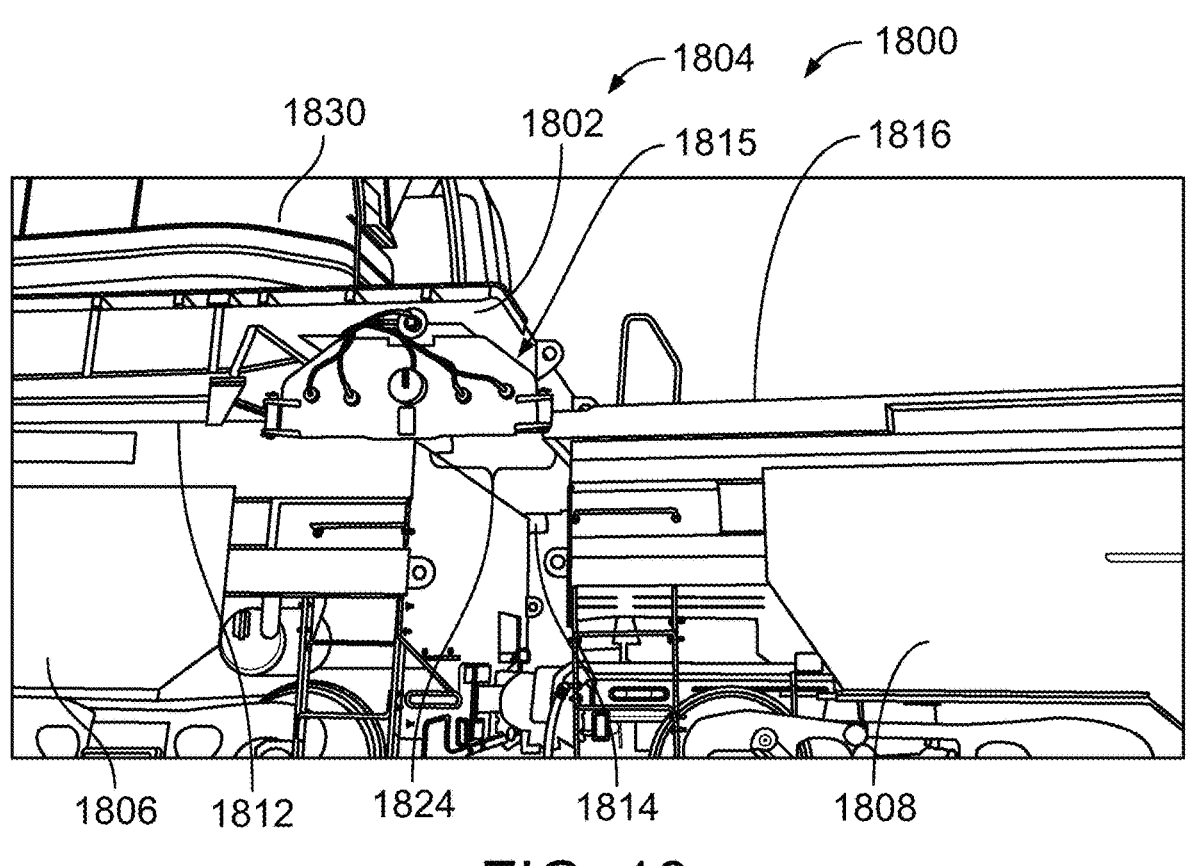
FIG. 18 illustrates a side perspective view of a system including a self-propelled platform for a vehicle system, according to at least one example of the present disclosure.

FIG. 18 illustrates a system 1800 that has a movable implement. In one example, the system is a bogie system. The system may include a self-propelled platform 1802 that may move along numerous vehicles of a vehicle system 1804. In one example, the self-propelled platform may be self-propelled because the self-propelled platform may move without an external force providing the motive power. Depending on the embodiment and application, the motive power may be mechanical power, hydraulic power, electric power, and the like to move the self-propelled platform along vehicles of a vehicle system. In various embodiments, the self-propelled platform may be controlled by a controller, such as a remote controller, which may include manual input, operate autonomously, and the like.

During operation, the self-propelled platform may travel from one to another of the vehicles of the vehicle system. This may be from a first vehicle 1806 to a second vehicle 1808, along with additional vehicles. In this example, the system is on the first vehicle while the second vehicle is to the right of the first vehicle. System, and in particular the self-propelled platform traverses along a first rail 1812 and second rail 1814 of the first vehicle. The first rail and second rail are spaced apart from one another, and in one example comprise a perimeter of the first vehicle. In an example the first rail and second rail are in parallel spaced relation to one another, and the self-propelled platform extends between the first rail and second rail with components of a wheel assembly 1815 contacting the first rail and the second rail. The components contacting the first rail and the second rail of the wheel assembly may include tracks, treads, tires, wheels, bearings, casters, and the like. The components may provide a coupling to the first rail and second rail of the first vehicle that allows movement of the self-propelled platform utilizing the wheel assembly while securing the self-propelled platform to the first rail and second rail to prevent movement of the self-propelled platform perpendicular to the first vehicle.

The second vehicle, similar to the first vehicle, may include a first rail 1816 and second rail (not shown) where the first rail of the second vehicle aligns with and corresponds with the first rail of the first vehicle, while the second rail of the second vehicle aligns with and corresponds with the second rail of the first vehicle. In this manner, the self-propelled platform may travel from on the first rail and the second rail of the first vehicle, across a gap 1824 and onto the first rail and second rail of the second vehicle such that a portion of the self-propelled platform remains on the first rail and second rail of the first vehicle while another portion of the self-propelled platform contacts and may be on the first rail and second rail of the second vehicle. Once the self-propelled platform moves completely across the gap, the wheel assembly components that contacted the first rail of the first vehicle now contact the corresponding first rail of the second vehicle while the wheel assembly components that contacted the second rail of the first vehicle now contact the corresponding second rail of the second vehicle.

The system may include an implement 1830 that is coupled to the self-propelled platform. Suitable implements may be, for example, an excavator, scoop, shovel, pick, brush, sprayer, and the like that may assist in the movement, unloading, treatment, handling and the like of materials. In one example, the implement is an excavator, that may include a scoop at the end that picks up material out of a corresponding vehicle and can unload the material. Alternatively, the implement may function to push materials in a vehicle out of an opening, wash the materials, treat the material, break up the materials, and the like. In one example, the implement may be rotatably coupled to the self-propelled platform to provide 360° of movement by the implement. The implement may include a stop element that limits movement of the implement or locks the implement in a fixed position. The implement may include manual inputs, remote inputs, be remote controlled, provide a compartment for an operator to sit, and the like. In one example, the implement may be controlled by the same controller that controls and operates the self-propelled platform. The implement in one example may be a first implement that is detachable from the self-propelled platform and replaced with a second implement. In each instance, the self-propelled platform travels across the numerous vehicles so the implement may be used to provide the function of the implement related to materials, cargo, and the like within the vehicles.

In another example, the wheels include a braking mechanism, and a locking mechanism. The braking mechanism may obtain data or information from sensors associated with the wheels of each wheel assembly, or the system itself. In an example, the sensor may be used to determine whether a gap is too large, misalignment between rails of adjacent vehicles has occurred, or the like. In this manner, if a threshold reading, such as a pressure reading, force reading, etc. is detected or not detected, the braking mechanism may automatically brake and stop the system to prevent the system from falling off the vehicle system, to prevent misalignment, or the like. In one example, a threshold number of wheels that contact a rail must be detected at all times by the sensor, otherwise the braking mechanism automatically stops the system. The locking mechanism may be a pin element, brake, stop element, or the like utilized to prevent movement of the system on the first rail and second rail of a vehicle. Once the system is in a working position to conduct work such as unloading, brushing, treating, etc., the locking mechanism secures the system in place on the first rail and second rail to prevent additional movement to facilitate the working function.

Figure 19:
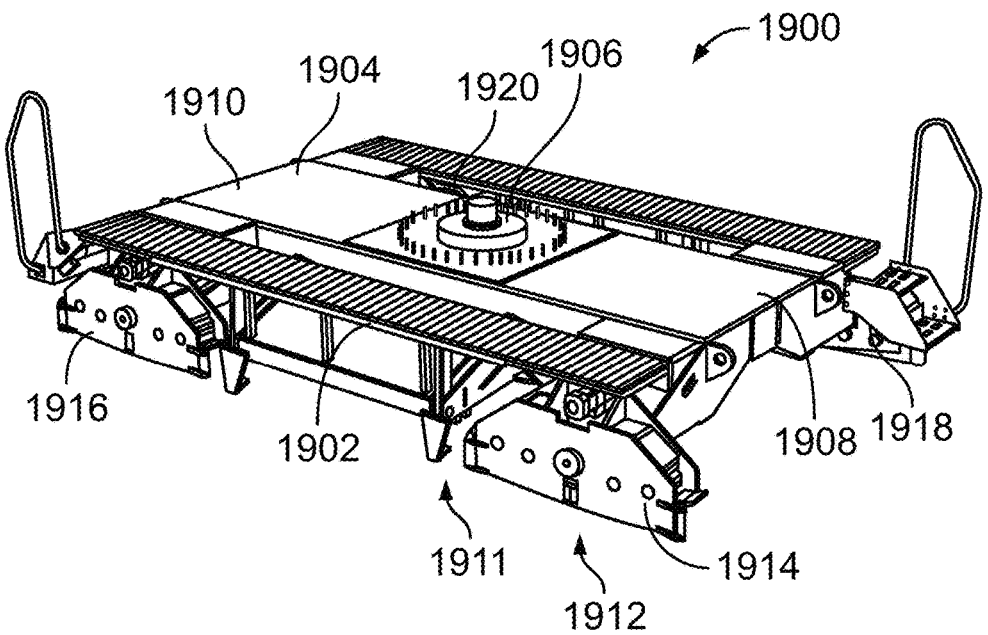
FIG. 19 illustrates a top perspective view of a self-propelled platform for a vehicle system, according to at least one example of the present disclosure.
Figure 20:
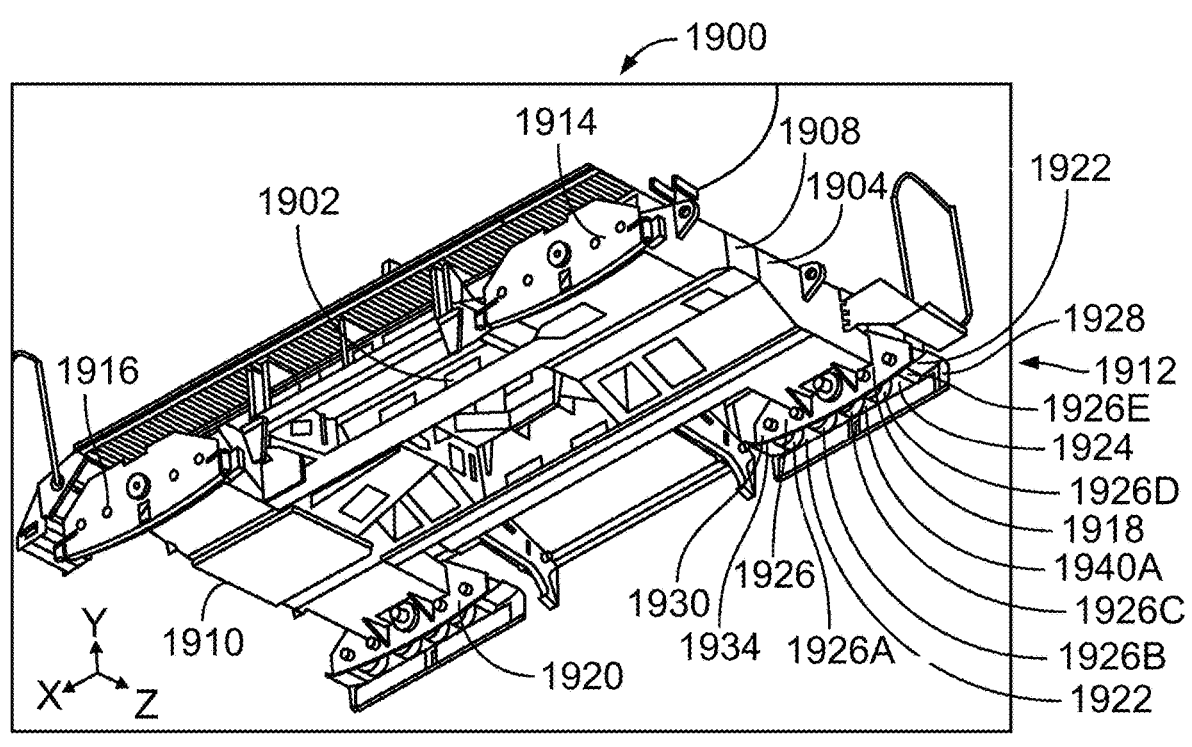
FIG. 20 illustrates a bottom perspective view of a self-propelled platform for a vehicle system, according to at least one example of the present disclosure.
Figure 21:
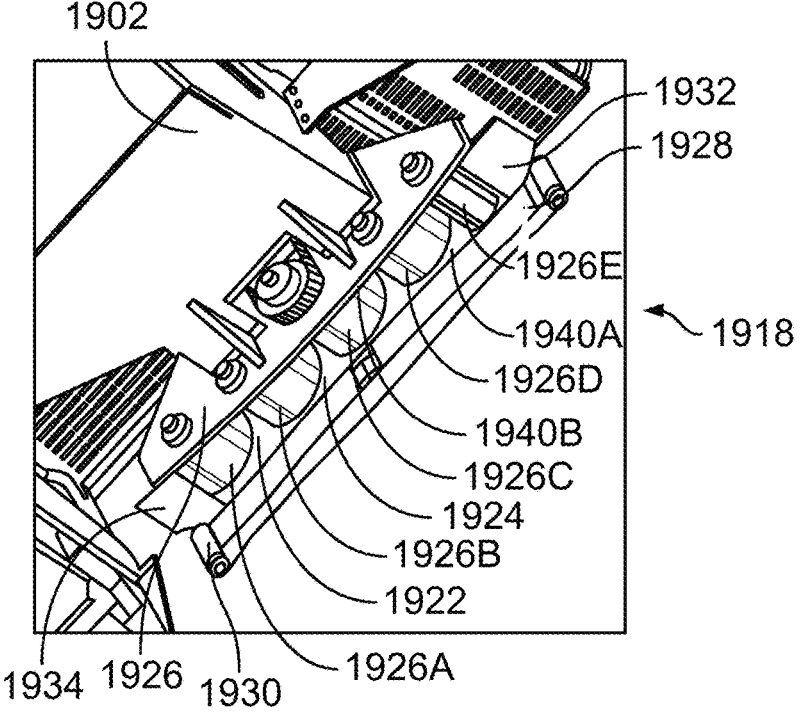
FIG. 21 illustrates a bottom perspective view of a wheel assembly of a system including a self-propelled platform for a vehicle system, according to at least one example of the present disclosure.

FIGS. 19-21 illustrates differing views of an example self-propelled platform 1900. In FIGS. 19-21 the implement is not illustrated to provide better illustration of the example coupling between the self-propelled platform and implement, and to provide better illustration of the other components of the self-propelled platform. In one example, the self-propelled platform of FIGS. 19-21 is the self-propelled platform illustrated in FIG. 18.

The self-propelled platform may include framework 1902 that supports a floor 1904 that receives a coupling device 1906. The floor may extend from a first end 1908 to a second end 1910. In the example, the coupling device is centrally located on the floor for receiving and coupling an implement to the floor. In one such example, the implement may be an excavator. In the example of FIGS. 19-21, the coupling device is presented to receive an implement that can rotate about the floor. Alternatively, other coupling devices may be provided for other types of implements, movements, and the like.

The system may include a platform mover 1911 for actuating a wheel assembly 1912 coupled and secured to the framework. Selection of the platform mover may be based at least in part on application specific parameters and requirements. A suitable platform mover may be mechanically based, electrically based, hydraulically based, and the like. The platform mover is responsible for movement of the self-propelled platform. The wheel assembly includes a first wheel assembly 1914, a second wheel assembly 1916, a third wheel assembly 1918, and a fourth wheel assembly 1920. In the example, the first wheel assembly is at the first end of the floor and aligns with the second wheel assembly at the second end of the floor. Conversely, the third wheel assembly is at the first end of the floor and aligns with the fourth wheel assembly at the second end of the floor. While described and shown with the first wheel assembly and the second wheel assembly aligned with one another on the first rail, the second wheel assembly could be considered a third wheel assembly while the third wheel assembly on the second rail is considered a second wheel assembly.

As illustrated in FIG. 21, each wheel assembly may include a channel 1922 that includes a first wall 1924 and a second wall of spaced relation. In an example, at least one of the first wall and/or second wall are secured to the framework and/or floor. The channel has a width between the first wall and second wall is greater than the width of at least one rail of a vehicle. In one example, at least one rail may be disposed between the first wall and second wall with the first wall and second wall extending past opposite edges of the rail.

Disposed within the channel between the first wall and second wall are plural wheels 1926A, 1926B, 1926C, 1926D, and 1926E. In one example, two of the five wheels are drive wheels, while the other three wheels are idling wheels. In other examples, only one, or more than two drive wheels may be used. While five wheels are illustrated, in other examples, more or less wheels may be provided. In other embodiments, not shown, the wheels may be arranged in side-by-side relation, staggered, be spring loaded, and the like. The plural wheels may be sized and shaped to contact and move along the top surface of a rail of a vehicle. Because first wall and second wall extend past either edge of the rail when the plural wheels contact the top surface of the rail, the first wall and second wall prevent lateral, or side-to-side movement of the plural wheels off the top surface the rail. In this manner, the channel secures the self-propelled platform to the rail while allowing the wheel assembly to move along the top surface of the rail.

In one example, the plural wheels are spaced from one another such that when a first wheel contacts a first rail of a first vehicle a final wheel can contact the first rail of a second vehicle. In such an example, wheels between the first wheel and last wheel may not engage either the first rail of the first vehicle or the first rail of the second vehicle, and instead may be over a first gap between the first vehicle and second vehicle. In this manner, the wheel assembly is of size and shape that a portion of the self-propelled platform may be over a first vehicle while another portion of the self-propelled platform is over a second vehicle. The powered wheels may be disposed on opposing ends of the wheel assembly. During transition of the platform, the first powered wheel may leave the first rail so that the second powered wheel, still engaged with the first rail, may provide motive power to the platform. As the first powered wheel engages the second rail, the second powered wheel may leave the first rail so that the platform's motive power is provided by the first wheel, now in contact with the second rail. Similarly, the support and weight distribution of the platform transfers from the first rail to the second rail, and the distribution of the weight through the wheels of the wheel assembly operates in a similar manner to the motive force. That is, while all the wheels are on the first rail, all the wheels bear the load of the platform. During a transition, the first wheel leaves the first rail, and the platform weight is supported by the remaining wheels (powered and unpowered) until the first wheel engages the second rail. Thereafter, the platform weight is supported by various wheels while they are in contact with either rail.

While the transitioning of the wheel assembly from one rail to another is happening on one side of the platform, in one embodiment, another wheel assembly may be transitioning from one to another rail of another rail set on another side of the platform. Additionally, if there is a wheel assembly in each of the four corners of a platform, after the first set of wheel assemblies transition, then a second set of wheel assemblies transition for completion of the traversal of the platform from the first vehicle to the second vehicle. Some embodiments may have additional wheel assembly sets, and so the process would be similar as each set makes the transition across a gap between the vehicles.

In one embodiment, the channel extends from a first side 1928 to a second side 1930 and has a first guide 1932 extending from the first side and a second guide 1934 extending from the second side. By having the five wheels along with the first guide and second guide each wheel assembly may span the gap between the first vehicle and second vehicle. In a particular and specific embodiment, each wheel assembly can be more than a meter (about four feet) in length. In addition, each guide may have an elongated body and function like a ski to guide a wheel assembly toward a corresponding rail of an adjacent vehicle. Each of the first guide and second guide extend away from the channel. For example, in the example of FIG. 18, when the second vehicle is to the right of the first vehicle, the first guide (e.g., the right guide in FIG. 20) extends away from the channel and towards the second vehicle. In the same example, the second guide (e.g., the left guide in FIG. 20) extends away from the channel and toward the third vehicle (not illustrated) that would be to the left of the first vehicle. In this manner, when moving toward another vehicle, regardless of a vehicle in front (e.g. to the right in FIG. 18) or in back (e.g. to the left in FIG. 18), a corresponding guide (e.g. first guide when the system moves to the right or forward, second guide when system moves to the left or back) contacts the adjacent vehicle (e.g. second vehicle to the right or forward in FIG. 18 and third vehicle to the left or backward in FIG. 18) before any of the plural wheels of a wheel assembly. The respective guide (e.g., first guide or second guide) contacts the corresponding rail of the adjacent vehicle resulting in the channel being guided or placed about the rail so that when the first of the plural wheels contacts the rail, the channel is already in place around the rail.

In one example, the guide may extend upwardly along with outwardly from the channel. In an example, the guide may slope upwardly or have a generally arcuate shape. In another example, the guide may angle upwardly in a straight direction to form a pathway with generally linear sidewalls. By having the guide extend upwardly, when adjacent vehicles are different heights, the upward extension ensures the guide still guides the channel around the corresponding rail, and the plural wheels onto the corresponding rail. Specifically, based on material weight, unloaded vehicles, etc. the height of adjacent vehicles can vary such that the upward extension ensures the wheel assembly appropriately transitions to the next adjacent vehicle without falling off a rail, and without the need for a separate bridge structure between the adjacent vehicles.

In another example, the first wall and second wall each have respective guide surfaces 1940A, and 1940B. The guide surfaces may be arcuate, an incline plane, and the like. The guide surfaces taper and/or are shaped so that the when the channel moves over a gap and towards a rail of an adjacent vehicle by following a guide, the rail is captured by the guide channel to ensure the proper spacing for the plural wheels contacting the rail. In addition, as the rail moves along the guide surfaces of each of the first wall and second wall, the self-propelled platform is secured in place on the rail.

Figure 22:
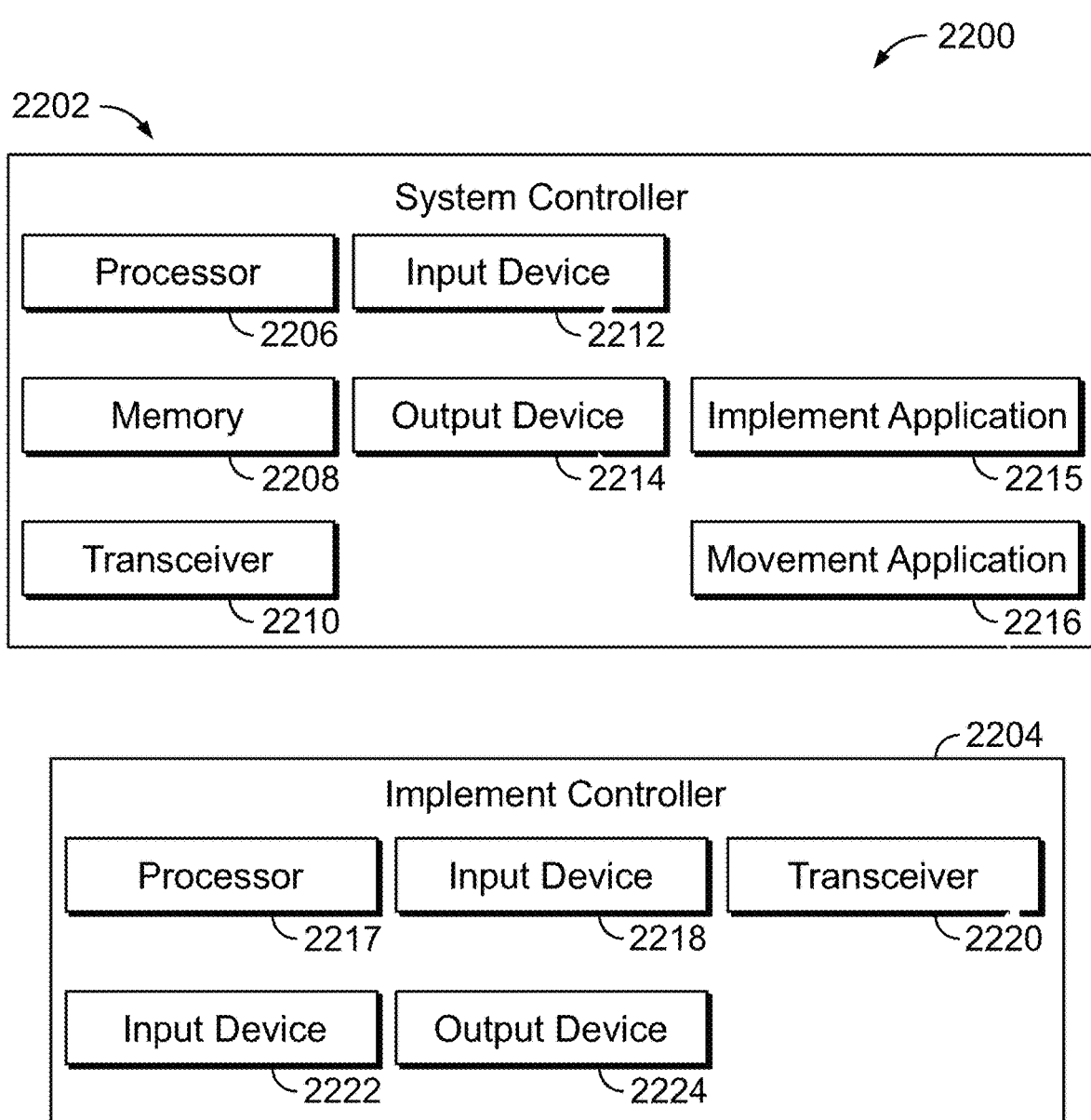
FIG. 22 illustrates a schematic diagram of a control system for a system including a self-propelled platform for a vehicle system, according to at least one example of the present disclosure.

FIG. 22 illustrates an example control system 2200 for a system for providing a movable implement. The control system may include a system controller 2202 that communicates with an implement controller 2204. The system controller may include one or more processors 2206 and a memory 2208, which may be an electronic, computer-readable storage device or medium. The memory may be within the housing of the system controller, or alternatively may be on a separate device that may be communicatively coupled to the first communication controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The first communication controller memory can include a tangible, non-transitory computer-readable storage medium that stores data on a temporary or permanent basis for use by the one or more processors. The memory may then be used by the one or more processors to access data for making determinations related to different modes of operation of the first communication controller.

The system controller may include a transceiver 2210 that may communicate with the implement controller and remote controller. The transceiver may be a single unit or be a separate receiver and transmitter. In one example, the transceiver may only transmit signals, but alternatively may send (e.g., transmit and/or broadcast) and receive signals.

The system controller may include an input device 2212 and an output device 2214. The input device may be an interface between an operator, or monitor, and the one or more processors. The input device may include a display or touch screen, input buttons, ports for receiving memory devices, etc. Similarly, the output device may present information and data to an operator or provide prompts for information and data. The output device may similarly be a display or touch screen. In this manner, a display or touch screen may be an input device and an output device.

The system controller may include an implement application 2215. The implement application may provide instructions to be implemented by the one or more processors for operating the implement. To this end, in one embodiment, an implement controller may not be provided, and the system controller may be used to control the functioning of the implement. The system controller may include a movement application 2216 that may provide instructions to be implemented by the one or more processors for moving the system and moving the self-propelled platform. The movement application may provide instructions for actuating the platform mover to cause movement of the system along a first vehicle, or from a first vehicle to a second vehicle or third vehicle. In one example, the movement application may include a machine learning, or artificial intelligence algorithm to autonomously move the system along the vehicle and from a first vehicle to a second vehicle or third vehicle. To this end, in one example, the movement application and implement application may communicate and utilize a machine learning and/or artificial intelligence algorithm to coordinate movement of the system along with operation of the implement to provide a completely autonomous system.

The implement controller may include one or more processors 2217, a memory 2218, transceiver 2220, input device 2222, and output device 2224. The implement controller may operate the implement. The implement controller may be operated by an individual operator. In one embodiment, the implement controller may operate autonomously. In one embodiment, the implement controller may have different operating modes. Suitable operating modes may include a traversal mode, an implement engagement mode, a hybrid mode, and a travel mode. The traversal mode may be engaged to move the platform from one vehicle to another, in such a mode the implement on the platform may be locked in place or may be moved to a selected location for the duration of the traversal (e.g., an implement arm may be retracted and tucked in). The implement engagement mode may be used where the implement on the platform performs its function. The hybrid mode may be used where the implement is deployed and functioning while the platform has at least partially transitioned from one vehicle to another. The travel mode may be where the wheel assembly and/or platform is locked in place (e.g., to a set of rails on a vehicle) so that the vehicles may move from one location to another.

Figure 23:
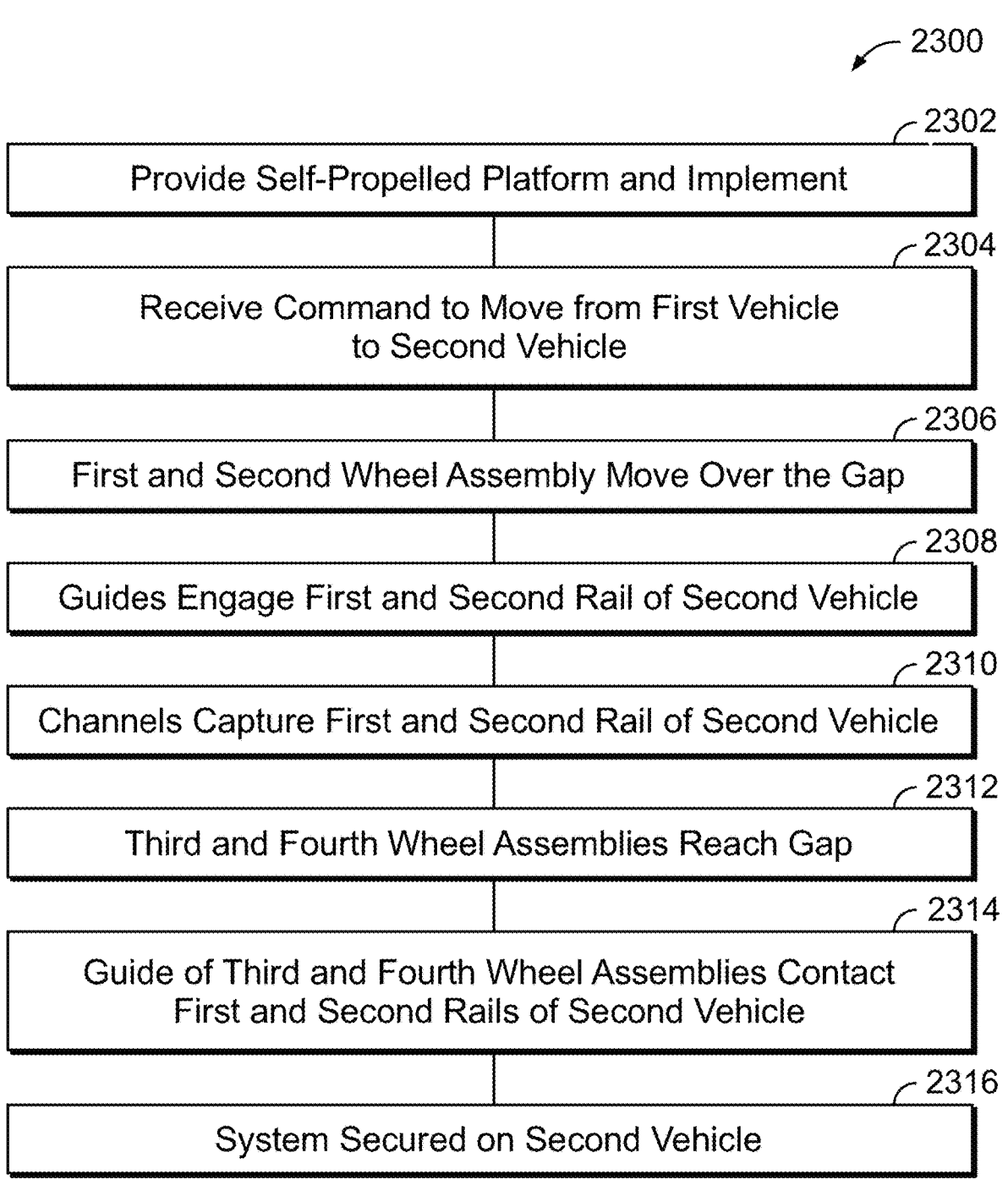
FIG. 23 illustrates a flowchart of a process for moving a system including a self-propelled platform between vehicles of a vehicle system, according to at least one example of the present disclosure.

FIG. 23 illustrates a method 2300 for utilizing a movable implement on a multi-vehicle vehicle system. In one example, the vehicle system is the vehicle system of FIG. 17. In another example, the method may be performed at least in part by the system of FIG. 18 or the controllers of FIG. 22.

At step 2302, a system that includes a self-propelled platform and an implement is provided on a first vehicle. In one example, the implement may be an excavator that may remove material from the first vehicle.

At step 2304, the system may be commanded to move from the first vehicle to an adjacent second vehicle. The command may be provided by a system controller, remote controller, and the like. Based on the command, the system moves from a position where all wheel assemblies of the system contact either a first rail of the first vehicle or a second rail of the first vehicle.

At step 2306, a first wheel assembly and a second wheel assembly at a first end of the system begins to move over a gap between the first vehicle and the second vehicle. The first wheel assembly includes a first guide at the first end that extends over the gap before any wheels, tracks, etc. of the wheel assembly begin going over the gap. Similarly, the second wheel assembly includes a first guide that extends over the gap before any wheels, tracks, etc.

At step 2308, the first guide of the first wheel assembly engages a first rail of the second vehicle, while the first guide of the second Wheel assembly engages a second rail of the second vehicle. The first guides of each wheel assembly guide the first wheel assembly and second wheel assembly, respectfully, along the first rail and second rail, respectfully, of the second vehicle. In this manner, the first wheel assembly and second wheel assembly remain aligned with the first rail and second rail of the second vehicle while the first wheel assembly and second wheel assembly go over the gap between the first vehicle and second vehicle. At this time, a portion of the system remains on the first vehicle secured on the first rail and second rail of the first vehicle.

At step 2310, the channel of the first wheel assembly captures the first rail of the second vehicle, while the channel of the second wheel assembly captures the second rail of the second vehicle system. In one example, each channel includes a first wall and second wall with guide surfaces for sliding against each rail as the first wheel assembly and second wheel assembly begin to move along the first rail and second rail of the second vehicle. In this manner, the first wheel assembly and second wheel assembly are secured to the first rail and second rail respectfully.

At step 2312, a third wheel assembly and fourth Wheel assembly located at a second end of the system reach the gap between the first vehicle and second vehicle. Each of the third Wheel assembly and fourth wheel assembly include first guides that extend over the gap between the first vehicle and second vehicle before the plural wheels, tracts, etc. of the respective third wheel assembly and fourth wheel assembly reach the gap.

At step 2314, the first guide members of the third wheel assembly and fourth wheel assembly contact the respective first rail and second rail of the second vehicle. At this time, a portion of the system is already over the second vehicle because the first wheel assembly and second wheel assembly have already been secured to the first rail and second rail respectfully of the second vehicle. The first guide members guide the system such that the channel of each of the respective third wheel assembly and fourth Wheel assembly contact the first rail and second rail respectfully.

At step 2316, as the system continues moving onto the second vehicle, the guide surfaces of the respective third wheel assembly and fourth wheel assembly secure the third wheel assembly and four wheel assembly to the first rail and second rail respectfully of the second vehicle. Once secured, the system may then move along the second vehicle accordingly.

The controller for the platform may include a sensor or locator so that the controller is aware of the proximity of the platform relative to an end of a vehicle, and/or the end of the rails on which the platform rests. The controller may perform one or more operations using that information. For example, the controller may notify an operator as the platform approaches to a determined distance to a rail end; may automatically stop the platform at the rail end or within a determined distance of the rail end; may automatically engage a traversal operating mode of the platform upon the platform reaching the rail end; may send an operating command to the implement so that the implement performs a determined task during (or in anticipation of) the traversal; and the like. In one embodiment, the controller signals the motive equipment for the first and/or second vehicles. For example, it may notify them that a traversal is or will occur and they should not attempt to move until complete traversal. In other embodiments, the controller receives information from the vehicle motive equipment that there is current movement, there is anticipated movement (to make a determination on whether to initiate a traversal), or that there is environmental information to consider. Regarding environmental information, that may include whether there is an upcoming turn in the route of the vehicles, upcoming infrastructure (bridge, tunnel, and the like), a grade, wayside equipment, a crossing (e.g., with a road), vegetation, an oncoming vehicle in an adjacent track, and the like, Additional information aspects may include to which side of the vehicles the information relates is the oncoming vehicle on the left or right side, will the vehicles be turning to their right or left, what is the height of the upcoming bridge, and so on. With such information, the controller may modify operation of the platform and/or the implement.

In some example embodiments, a system is provided that may include a self-propelled platform that may traverse a first rail and a second rail of a first vehicle, the first rail and the second rail separated in spaced relation. The self-propelled platform may include a wheel assembly that may engage the first rail and the second rail. The wheel assembly may include at least one guide extending away from the self-propelled platform and having a size and shape to engage a first rail of a first vehicle or a first rail of a second vehicle while a portion of the self-propelled platform remains on the first rail of the first vehicle, to guide the wheel assembly onto the first rail of the second vehicle.

The self-propelled platform may include an implement coupling for receiving an implement. In one aspect, the implement may be an excavator that may excavate materials from the first vehicle or the second vehicle. In another aspect, the first vehicle and the second vehicle may be coupled and may be part of a rail vehicle system. In one example, the wheel assembly may include a first wheel assembly having plural wheels aligned with one another and within a channel of size and shape to have the first rail of the first vehicle or the first rail of the second vehicle disposed between a first wall and second wall of the channel. In another example, the guide may extend from the channel of the first wheel assembly. In yet another example, the first wall of the channel may include a first guide surface that may guide the wheel assembly onto the first rail of the first vehicle or the first rail of the second vehicle. In another example, the second wall of the channel may include a second guide surface that may guide the wheel assembly onto the first rail of the first vehicle or the first rail of the second vehicle.

Optionally, the wheel assembly may include a first wheel assembly that may engage the first rail of the first vehicle and a second wheel assembly aligned with the first wheel assembly and that may engage the first rail of the first vehicle. In one aspect, the wheel assembly may include a third wheel assembly that may engage a second rail of the first vehicle and a fourth wheel assembly aligned with the third wheel assembly and that may engage the second rail of the first vehicle. In another aspect, the at least one guide may be a first guide that may extend from the first wheel assembly and may engage the first rail of the second vehicle. The system may include a second guide that may extend from the second wheel assembly and having a size and shape to engage a first rail of a first vehicle while a portion of the self-propelled platform is on the first rail of the section vehicle, to guide the wheel assembly onto the first rail of the second vehicle. In one example, the system may include a third guide that may extend from the third wheel assembly and may have a size and shape to engage the second rail of the second vehicle to guide the wheel assembly onto the second rail of the second vehicle. The system may additionally have a fourth guide that may extend from the fourth wheel assembly and may have a size and shape to engage the second rail of the first vehicle to guide the wheel assembly onto the second rail of the second vehicle. In another example, the at least one guide may extend upwardly from the wheel assembly.

In one or more examples, a system is provided that may include a self-propelled platform that may traverse a first rail of a first vehicle and a first rail of a second vehicle, the first rail of the first vehicle and the first rail of the second vehicle separated in spaced relation. The self-propelled platform may include a wheel assembly that may engage the first rail of the first vehicle and the first rail of the second vehicle. The wheel assembly may include a first wheel assembly that may have first plural wheels and a first guide extending away from the self-propelled platform. The first guide may have a size and shape to engage a first rail of a second vehicle to guide the self-propelled platform onto the first rail of the second vehicle. The system may include a second wheel assembly having second plural wheels and a second guide extending away from the self-propelled platform. The second guide may have a size and shape to engage a second rail of the second vehicle to guide the self-propelled platform onto the second rail of the second vehicle.

Optionally, the first wheel assembly may include a first wall with a first tapered section, and a second wall having a second tapered section. The first wall may be spaced from the second wall to form a first channel of size and shape to have the first rail of the first vehicle and the first rail of the second vehicle to be disposed within the first channel. In one aspect, the self-propelled platform may include an implement coupling for receiving an implement. In another aspect, the implement may be an excavator that may excavate materials from the first vehicle or the second vehicle In one or more examples, a system is provided that may include a self-propelled platform that can be coupled to an excavator and that may traverse a first rail and a second rail of a first vehicle. The first rail and the second rail may be separated in spaced relation. The self-propelled platform may include a wheel assembly that may engage the first rail and the second rail. The wheel assembly may include a first wheel assembly having first plural wheels and a first guide extending away from the self-propelled platform. The first guide may have a size and shape to engage a first rail of a second vehicle to guide the self-propelled platform onto the first rail of the second vehicle. The wheel assembly may additionally include a second wheel assembly having second plural wheels and a second guide extending away from the self-propelled platform. The second guide may have a size and shape to engage a second rail of the second vehicle to guide the self-propelled platform onto the second rail of the second vehicle.

Optionally, the wheel assembly may include a third wheel assembly having third plural wheels and a third guide extending away from the self-propelled platform. The third guide may have a size and shape to engage a first rail of the first vehicle to guide the self-propelled platform onto the first rail of the second vehicle. The wheel assembly may additionally include a fourth wheel assembly having fourth plural wheels and a fourth guide extending away from the self-propelled platform. The fourth guide may have a size and shape to engage a second rail of the first vehicle to guide the self-propelled platform onto the second rail of the second vehicle. In one aspect, the excavator may be rotatably coupled on the self-propelled platform.

Referring now to FIGS. 1-23 as a whole, the system and associated methods for vegetation control, maintenance of way along a route, or vehicular transport as disclosed herein with respect to FIGS. 1-16 may be combined, in part or entirely, with the system and associated methods that may include a self-propelled platform that can travel between vehicles of a multi-vehicle vehicle system as disclosed herein with respect to FIGS. 17-23.

In one example embodiment, a vehicle system with spray control is disclosed. The vehicle system may include a vehicle, a self-propelled platform, a dispenser, and a controller. The vehicle may include a first rail and a second rail. The first and second rails may extend along a length of the vehicle and parallel to one another. The self-propelled platform may include a first wheel assembly, a second wheel assembly, and a coupling device. The first and second wheel assemblies may be configured to engage the first and second rails, respectively, to advance the self-propelled platform relative to the vehicle. The coupling device may be centrally positioned on a floor of the self-propelled platform. The dispenser may be configured to dispense a composition onto at least a portion of an environmental feature adjacent to the vehicle. The dispenser may be further configured to be received by the coupling device to couple the dispenser to the self-propelled platform and to keep the dispenser in a central position on the floor of the self-propelled platform. The controller may be configured to operate one or more of the vehicle, the self-propelled platform, or the dispenser based at least in part on environmental information that includes one or more of a contents level of dispenser tanks, a type of vegetation, a direction of travel of the vehicle, curve or grade information of a vehicle route, a direction of travel of wind adjacent to the vehicle, a windspeed of air adjacent to the vehicle, or a distance of the vehicle from the vegetation.

In some example embodiments, the first rail may be positioned on one side of the vehicle and the second rail may be positioned on an opposite side of the vehicle. The first and second rails of the vehicle may line up with first and second rails, respectively, of a second vehicle such that the self-propelled platform, and specifically the first and second wheel assemblies of the self-propelled platform, may move between the two different vehicles. In some example embodiments, the self-propelled platform may include a third wheel assembly and a fourth assembly. The first and third wheel assemblies may be substantially in-line with one another such that the first and third wheel assemblies can engage the first rail of the vehicle simultaneously. Similarly, the second and fourth wheel assemblies may be substantially in-line with one another such that the second and third wheel assemblies can engage the second rail of the vehicle simultaneously. In some example embodiments, the self-propelled platform may include one, two, three, four, or more than four wheel assemblies.

In one example embodiment, a method is disclosed. The method may include obtaining environmental information associated with an environmental feature adjacent to a vehicle, the environmental information may include one or more of a type of vegetation of the environmental feature, a curve or grade of a route on which the vehicle is traveling, a direction of wind, a speed of the wind, or a distance from the vehicle to the environmental feature. The method may further include selecting at least one spray nozzle from a plurality of spray nozzles of a dispenser centrally positioned onboard a self-propelled platform, where the self-propelled platform may be coupled to the vehicle, and where the self-propelled platform may be configured to move relative to the vehicle. The method may further include dispensing a composition onto at least a portion of the environmental feature adjacent to the vehicle, where the composition may be dispensed from the at least one spray nozzle. The method may further include advancing the self-propelled platform relative to the vehicle and based at least in part on the environmental information.

In one example embodiment, a system is disclosed. The system may include a self-propelled platform, a dispenser, and a controller. The self-propelled platform may include at least one assembly and a coupling device. The at least one wheel assembly may be configured to engage at least one rail of a vehicle to advance the self-propelled platform relative to the vehicle. The coupling device may be centrally positioned on a floor of the self-propelled platform. The dispenser may be configured to dispense a composition onto at least a portion of an environmental feature adjacent to the vehicle. The dispenser may be further configured to be received by the coupling device to couple the dispenser to the self-propelled platform and to keep the dispenser in a central position on the floor of the self-propelled platform. The controller may be configured to operate one or more of the vehicle, the self-propelled platform, or the dispenser based at least in part on the environmental feature and a curve of a route on which the vehicle is traveling, where the controller may be configured to control the dispenser to spray a first quantity of chemical composition from a first side of the self-propelled platform and a second quantity of chemical composition from a second side of the self-propelled platform during travel of the vehicle on the curve, where the first and second quantities are different, and where the first and second sides are different.

In some example embodiments, the devices disclosed herein may perform one or more processes described herein. In some example embodiments, the device disclosed herein may perform these processes based on a processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the system may have a local data collection system deployed that may use machine learning to enable derivation-based learning outcomes. The communication system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The maintenance system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and to enable a person of ordinary skill in the art to practice the embodiments of the inventive subject matter, including making and using any devices or systems and performing any incorporated methods. The patentable scope of the inventive subject matter is defined by the numbered claims below, and may include other examples that occur to those of ordinary skill in the art. Such other examples are intended to be within the scope of the claims if they have structural elements that do not differ from the literal language of the claims, or if they include equivalent structural elements with insubstantial differences from the embodiments described by the literal language of the claims.

What is claimed is:

1. A vehicle system with spray control, the vehicle system comprising:

a vehicle comprising a first rail and a second rail, wherein the first rail extends along a length of the vehicle, and wherein the second rail extends along the length of the vehicle and parallel to the first rail;

a self-propelled platform comprising a first wheel assembly, a second wheel assembly, and a coupling device, wherein the first and second wheel assemblies are configured to engage the first and second rails, respectively, to advance the self-propelled platform relative to the vehicle, and wherein the coupling device is centrally positioned on a floor of the self-propelled platform;

a dispenser configured to dispense a composition onto at least a portion of an environmental feature adjacent to the vehicle, the dispenser further configured to be received by the coupling device to couple the dispenser to the self-propelled platform and to keep the dispenser in a central position on the floor of the self-propelled platform; and a controller configured to operate one or more of the vehicle, the self-propelled platform, or the dispenser based at least in part on environmental information that includes one or more of a contents level of dispenser tanks, a type of vegetation, a direction of travel of the vehicle, curve or grade information of a vehicle route, a direction of travel of wind adjacent to the vehicle, a windspeed of air adjacent to the vehicle, or a distance of the vehicle from the vegetation.

2. The vehicle system of claim 1, wherein the controller is configured to communicate with a position device, and wherein the controller is further configured to actuate the dispenser based at least in part on position data obtained by the controller from the position device.

3. The vehicle system of claim 1, wherein the controller is configured to acquire spray condition data for spraying the composition comprising an herbicide from a storage tank to a spray range defined at least in part by the environmental feature adjacent to the vehicle.

4. The vehicle system of claim 1, wherein the dispenser comprises a plurality of spray nozzles for spraying herbicides at different heights in a vertical direction.

5. The vehicle system of claim 1, wherein the dispenser comprises a variable angle spray nozzle capable of automatically adjusting a spraying angle of the composition.

6. The vehicle system of claim 1, wherein the environmental information further comprises one or more of a traveling speed of the vehicle or the self-propelled platform, an operating condition of the dispenser, a quantity of the vegetation, a terrain feature of a route section adjacent to the dispenser, an ambient humidity level, an ambient temperature level, or a distance of the vehicle from a determined protected location.

7. The vehicle system of claim 1, wherein the dispenser comprises plural dispenser nozzles through which the composition is sprayed, and wherein the controller is configured to respond to the environmental information by switching operating modes with different ones of the operating modes selectively activating different subsets nozzles of the dispenser nozzles and spraying the composition using the nozzles in the subset that is activated.

8. The vehicle system of claim 1, wherein the dispenser comprises plural dispenser nozzles organized into subsets, and wherein the controller is configured to control the subsets of the dispenser nozzles to one or more of: spray only on one side of the vehicle, high spraying, low spraying, horizontal spraying, forward spraying, or rearward spraying.

9. The vehicle system of claim 1, wherein the dispenser comprises adjustable nozzles having different spray patterns including a wide spray pattern and a narrow streaming spray pattern, and wherein the controller is configured to switch the adjustable nozzles between spraying the composition from the adjustable nozzles in the wide spray pattern or spraying the composition from the adjustable nozzles in the narrow streaming spray pattern based at least in part on the environmental information.

10. The vehicle system of claim 1, wherein the dispenser comprises adjustable nozzles configured to be selectively pointed in determined directions, and wherein the controller is configured to change which of the determined directions that the adjustable nozzles are pointed during spraying of the composition based at least in part on the environmental information.

11. The vehicle system of claim 1, wherein the controller controls a concentration of active chemicals within the composition being sprayed through the dispenser.

12. The vehicle system of claim 1, wherein the composition is a mixture of multiple active chemicals, and wherein the controller is configured to control a mixture ratio of the multiple active chemicals.

13. The vehicle system of claim 12, wherein the controller is configured to determine one or more of the mixture ratio or a concentration of the active chemicals in the composition in response to detection of one or more of a type of vegetation, a type of weed, or a size of the weed.

14. The vehicle system of claim 1, wherein the controller is configured to selectively determine a concentration, a mixture, or both the concentration and the mixture of the composition based at least in part on a vehicle location relative to a sensitive zone that includes a populated area or a protected wetland.

15. The vehicle system of claim 1, wherein the dispenser is configured to selectively add a foaming agent to the composition.

16. The vehicle system of claim 1, wherein the controller is configured to control a pressure at which the dispenser dispenses the composition.

17. The vehicle system of claim 1, wherein the controller is configured to select one or more nozzles of the dispenser or adjust an aim of the one or more nozzles.

18. The vehicle system of claim 1, wherein the vehicle is a high rail vehicle configured to selectively travel on a rail track and on a roadway.

19. A method, comprising:

obtaining environmental information associated with an environmental feature adjacent to a vehicle, the environmental information including one or more of a type of vegetation of the environmental feature, a curve or grade of a route on which the vehicle is traveling, a direction of wind, a speed of the wind, or a distance from the vehicle to the environmental feature;

selecting at least one spray nozzle from a plurality of spray nozzles of a dispenser centrally positioned onboard a self-propelled platform, wherein the self-propelled platform is coupled to the vehicle, and wherein the self-propelled platform is configured to move relative to the vehicle;

dispensing a composition onto at least a portion of the environmental feature adjacent to the vehicle, wherein the composition is dispensed from the at least one spray nozzle; and advancing the self-propelled platform relative to the vehicle and based at least in part on the environmental information.

20. A system, comprising:

a self-propelled platform comprising at least one wheel assembly and a coupling device, wherein the at least one wheel assembly is configured to engage at least one rail of a vehicle to advance the self-propelled platform relative to the vehicle, and wherein the coupling device is centrally positioned on a floor of the self-propelled platform;

a dispenser configured to dispense a composition onto at least a portion of an environmental feature adjacent to the vehicle, the dispenser further configured to be received by the coupling device to couple the dispenser to the self-propelled platform and to keep the dispenser in a central position on the floor of the self-propelled platform; and a controller configured to operate one or more of the vehicle, the self-propelled platform, or the dispenser based at least in part on the environmental feature and a curve of a route on which the vehicle is traveling, wherein the controller is configured to control the dispenser to spray a first quantity of chemical composition from a first side of the self-propelled platform and a second quantity of chemical composition from a second side of the self-propelled platform during travel of the vehicle on the curve, wherein the first and second quantities are different, and wherein the first and second sides are different.

* * * * *